(12) United States Patent
Kipf et al.

(10) Patent No.: US 12,417,623 B2
(45) Date of Patent: Sep. 16, 2025

(54) CONDITIONAL OBJECT-CENTRIC LEARNING WITH SLOT ATTENTION FOR VIDEO AND OTHER SEQUENTIAL DATA

(71) Applicant: Google LLC, Mountain View, CA (US)

(72) Inventors: Thomas Kipf, Amsterdam (NL); Gamaleldin Elsayed, Milpitas, CA (US); Aravindh Mahendran, Berlin (DE); Austin Charles Stone, San Francisco, CA (US); Sara Sabour Rouh Aghdam, Toronto (CA); Georg Heigold, Aachen (DE); Rico Jonschkowski, Mountain View, CA (US); Alexey Dosovitskiy, Berlin (DE); Klaus Greff, Berlin (DE)

(73) Assignee: Google LLC, Mountain View, CA (US)

( * ) Notice: Subject to any disclaimer, the term of this patent is extended or adjusted under 35 U.S.C. 154(b) by 602 days.

(21) Appl. No.: 17/726,374

(22) Filed: Apr. 21, 2022

(65) Prior Publication Data
US 2022/0383628 A1    Dec. 1, 2022

Related U.S. Application Data

(60) Provisional application No. 63/194,425, filed on May 28, 2021.

(51) Int. Cl.
*G06V 10/82* (2022.01)
*G06V 10/40* (2022.01)
*G06V 10/774* (2022.01)

(52) U.S. Cl.
CPC .............. *G06V 10/82* (2022.01); *G06V 10/40* (2022.01); *G06V 10/7747* (2022.01)

(58) Field of Classification Search
CPC .... G06V 10/82; G06V 10/40; G06V 10/7747; G06V 10/7715; G06V 10/774;
(Continued)

(56) References Cited

U.S. PATENT DOCUMENTS 9,904,677 B2 * 2/2018 Hamada ................ G06F 40/237
11,227,217 B1 * 1/2022 Wang ..................... G06N 3/044
(Continued)

FOREIGN PATENT DOCUMENTS

CN    107391646 B    4/2020
CN    112749209 B    8/2023

OTHER PUBLICATIONS

Jiang et al., "SCALOR: Generative World Models with Scalable Object Representations," In International Conference on Learning Representations, arXiv:1910.02384v4, Mar. 4, 2020, 22 pages.
(Continued)

*Primary Examiner* — Matthew C Bella
*Assistant Examiner* — Andrew B. Jones
(74) *Attorney, Agent, or Firm* — McDonnell Boehnen Hulbert & Berghoff LLP

(57) ABSTRACT

A method includes obtaining first feature vectors and second feature vectors representing contents of a first and second image frame, respectively, of an input video. The method may also include generating, based on the first feature vectors, first slot vectors, where each slot vector represents attributes of a corresponding entity as represented in the first image frame, and generating, based on the first slot vectors, predicted slot vectors including a corresponding predicted slot vector that represents a transition of the attributes of the corresponding entity from the first to the second image frame. The method may additionally include generating, based on the predicted slot vectors and the second feature vectors, second slot vectors including a corresponding slot vector that represents the attributes of the corresponding entity as represented in the second image frame, and determining an output based on the predicted slot vectors or the second slot vectors.

20 Claims, 8 Drawing Sheets

(58) Field of Classification Search
CPC .......... G06V 20/40; G06F 18/29; G06N 3/08; G06N 3/049
See application file for complete search history.

(56) References Cited

U.S. PATENT DOCUMENTS

| | | | |
|---|---|---|---|
| 2017/0262996 A1* | 9/2017 | Jain | G06V 10/462 |
| 2018/0007382 A1* | 1/2018 | Pio | H04N 19/172 |
| 2020/0050940 A1 | 2/2020 | Li et al. | |
| 2020/0092565 A1* | 3/2020 | Watters | G06N 3/044 |
| 2021/0089867 A1* | 3/2021 | Byeon | G06N 3/082 |
| 2021/0201044 A1* | 7/2021 | Herdade | G06T 11/20 |
| 2021/0383199 A1 | 12/2021 | Weissenborn et al. | |
| 2022/0043972 A1* | 2/2022 | Nishida | G06F 40/20 |

OTHER PUBLICATIONS

Johnson et al., "CLEVR: A Diagnostic Dataset for Compositional Language and Elementary Visual Reasoning," In Proceedings of the IEEE Conference on Computer Vision and Pattern Recognition, arXiv:1612.06890v1, Dec. 20, 2016, 17 pages.

Kabra et al., "SIMONe: View-Invariant, Temporally-Abstracted Object Representations via Unsupervised Video Decomposition," 35th Conference on Neural Information Processing Systems 2021, arXiv:2106.03849v2, Dec. 6, 2021, 30 pages.

Kahneman et al., "The Reviewing of Object Files: Object-Specific Integration of Information," Cognitive Psychology, 1992, pp. 175-219, vol. 24, No. 2.

Kamath et al., "MDETR—Modulated Detection for End-to-End Multi-Modal Understanding," arXiv:2104.12763, 2021, 22 pages.

Karazija et al., "ClevrTex: A Texture-Rich Benchmark for Unsupervised Multi-Object Segmentation," 35th Conference on Neural Information Processing Systems, arxiv:2111.10265v1, Nov. 19, 2021, 25 pages.

Kingma et al., "Adam: A Method for Stochastic Optimization," In International Conference on Learning Representations, arXiv:1412.6989v9, Jan. 30, 2017, 15 pages.

Kipf et al., "Contrastive learning of structured world models," In International Conference on Learning Representations, arXiv:1911.12247v2, Jan. 5, 2020, 21 pages.

Kosiorek et al., "Sequential attend, infer, repeat: Generative modelling of moving objects," 32nd Conference on Neural Information Processing Systems, arXiv:1806.01794v2, Nov. 21, 2018, 25 pages.

Li et al, "Joint-task Self-supervised Learning for Temporal Correspondence," 33rd Conference on Neural Information Processing Systems, arXiv:1909.11895v1, Sep. 26, 2019, 12 pages.

Lin et al,. "SPACE: Unsupervised Object-Oriented Scene Representation via Spatial Attention and Decomposition," In International Conference on Learning Representations, arXiv:2001.02407v3, Mar. 15, 2020, 22 pages.

Locatello et al., "Object-Centric Learning with Slot Attention," 34th Conference on Neural Information Processing Systems, arXiv:2006.15055v2, Oct. 14, 2020, 27 pages.

Long et al., "Fully Convolutional Networks for Semantic Segmentation," In Proceedings of the IEEE Conference on Computer Vision and Pattern Recognition, arXiv:1411.4038v2, Mar. 8, 2015, 10 pages.

Loschilov et al., "SGDR: Stochastic Gradient Descent with Warm Restarts," In International Conference on Learning Representations, arXiv:1608.03983v5, May 3, 2017, 16 pages.

Luiten et al., "PReMVOS: Proposal-generation, Refinement and Merging for Video Object Segmentation," In Asian Conference on Computer Vision, arXiv:1807.09190v2, Nov. 3, 2018, 16 pages.

Mahendran et al., "Cross Pixel Optical-Flow Similarity for Self-Supervised Learning," In Asian Conference on Computer Vision, arXiv:1807.05636v1, Jul. 15, 2018, 17 pages.

Meinhardt et al., "TrackFormer: Multi-Object Tracking with Transformers," arXiv:2101.02702v2, Apr. 28, 2021, 14 pages.

Pont-Tuset et al., "The 2017 DAVIS Challenge on Video Object Segmentation," arXiv:1704.00675v3, Mar. 1, 2018, 6 pages.

Sabour et al., "Dynamic Routing Between Capsules," In Advances in Neural Information Processing Systems, arXiv:1710.09829v2, 2017, pp. 3856-3866.

Sabour et al., "Unsupervised Part Representation by Flow Capsules," arXiv preprint arXiv:2011.13920v2, Feb. 19, 2021, 11 pages.

Santoro et al., "Relational recurrent neural networks," 32nd Conference on Neural Information Processing Systems, 2018, pp. 7299-7310.

Spelke et al., "Core knowledge," Developmental Science, 2007, pp. 89-96, vol. 10, No. 1.

Stanić et al., "R-SQAIR: Relational Sequential Attend, Infer, Repeat," NeurIPS 2019 Workshop on Perception as Generative Reasoning: Structure, Causality, Probability, Vancouver, Canada, arXiv:1910.05231V1, Oct. 11, 2019, 6 pages.

Stelzner et al., "Decomposing 3D Scenes into Objects via Unsupervised vol. Segmentation," arXiv:2104.01148v1, Apr. 2, 2021, 15 pages.

Stelzner et al., "Faster Attend-Infer-Repeat with Tractable Probabilistic Models," Proceedings of the 36th International Conference on Machine Learning, 2019, pp. 5966-5975.

Stone et al., "SMURF: Self-Teaching Multi-Frame Unsupervised RAFT with Full-Image Warping," In Proceedings of the IEEE Conference on Computer Vision and Pattern Recognition, 2021, pp. 3887-3896.

Sun et al., "PWC-Net: CNNs for Optical Flow Using Pyramid, Warping, and Cost Volume," In Proceedings of the IEEE Conference on Computer Vision and Pattern Recognition, 2018, pp. 8934-8943.

Van Steenkiste et al., Relational Neural Expectation Maximization: Unsupervised Discovery of Objects and their Interactions, International Conference on Learning Representations, arXiv:1802.10353v1, Feb. 28, 2018, 15 pages.

Vaswani et al., "Attention Is All You Need," 31st Conference on Neural Information Processing Systems, arXiv:1706.03762v5, 2017, pp. 5998-6008.

Veerapaneni et al., "Entity Abstraction in Visual Model-Based Reinforcement Learning," 3rd Conference on Robot earning (CoRL 2019), Osaka, Japan, arXiv:1910.128275v5, May 6, 2020, pp. 1439-1456.

Walker et al., "Dense Optical Flow Prediction from a Static Image," In Proceedings of the IEEE International Conference on Computer Vision, 2015, pp. 2443-2451.

Watters et al., "Spatial Broadcast Decoder: A Simple Architecture for Learning Disentangled Representations in VAEs," arXiv:1901.07017v2, Aug. 14, 2019, 35 pages.

Weis et al., "Benchmarking Unsupervised Object Representations for Video Sequences," arXiv:2006.07034v4, Jun. 29, 2021, 61 pages.

Yang et al., "Self-supervised Video Object Segmentation by Motion Grouping," arXiv:2104.07658v2, Aug. 11, 2021, 18 pages.

Yi et al., "CLEVRER: Collision Events for Video Representation and Reasoning," In International Conference on Learning Representations, 2020, 19 pages.

Zhang et al., "A Transductive Approach for Video Object Segmentation," In Proceedings of the IEEE Conference on Computer Vision and Pattern Recognition, 2020, pp. 6949-6958.

Zhao et al., "TubeR: Tube-Transformer for Action Detection," arXiv preprint arXiv:2104.00969, 2021, 10 pages.

Ba et al., "Layer normalization," arXiv:1607.06450v1, Jul. 21, 2016, 14 pages.

Bar et al., "Compositional Video Synthesis with Action Graphs," In International Conference on Machine Learning, arXiv:2006.15327v4, Jun. 10, 2021, 18 pages.

Battaglia et al., "Interaction Networks for Learning about Objects, Relations and Physics," In Advances in Neural Information Processing Systems arXiv:1612.00222v1, Dec. 1, 2016, pp. 4502-4510.

Bear et al., "Learning physical graph representations from visual scenes," arXiv:2006.12373v2, Jun. 24, 2020, 23 pages.

Blender Online Community. Blender—a 3D modelling and rendering package. Blender Foundation, Stichting Blender Foundation, Amsterdam, 2021. URL http://www.blender.org, 15 pages.

(56) References Cited

OTHER PUBLICATIONS

Bradbury et al., "JAX: composable transformations of Python+NumPy programs," http://github.com/google/jax, 2018, 12 pages.
Burgess et al., "MONet: Unsupervised Scene Decomposition and Representation," arXiv:1901.11390, Jan. 22, 2019, 22 pages.
Cabi et al., "Scaling data-driven robotics with reward sketching and batch reinforcement learning," In Robotics: Science and Systems Conference 2020, arXiv:1909.12200v3, Jun. 4, 2022, 11 pages.
Caelles et al., "One-Shot Video Object Segmentation," In Proceedings of the IEEE Conference on Computer Vision and Pattern Recognition, arXiv:1611.05198v4, 2017, pp. 221-230.
Caelles et al., "The 2019 DAVIS Challenge on VOS: Unsupervised Multi-Object Segmentation," arXiv:1905.00737v1, May 2, 2019, 4 pages.
Carion et al., "End-to-End Object Detection with Transformers," In European Conference on Computer Vision, arXiv:2005.12872v3, May 28, 2020, 26 pages.
Caron et al., "Emerging Properties in Self-Supervised Vision Transformers," arXiv:2104.14294v2, May 24, 2021, 21 pages.
Chen et al., "Object-Centric Representation and Rendering of 3D Scenes," arXiv:2006.06130v3, Jul. 1, 2021, 34 pages.
Chen et al., "Grounding Physical Concepts of Objects and Events Through Dynamic Visual Reasoning," In International Conference on Learning Representations, arXiv:2103.16564v1, Mar. 30, 2021, 20 pages.
Cho et al., Learning Phrase Representations using RNN Encoder-Decoder for Statistical Machine Translation, In Proceedings of the 2014 Conference on Empirical Methods in Natural Language Processing (EMNLP), 2014, pp. 1724-1734.
Crawford et al., "Spatially Invariant Unsupervised Object Detection with Convolutional Neural Networks," The Thirty-Third AAAI Conference on Artificial Intelligence, 2019, pp. 3412-3420, vol. 33.
Crawford et al., "Exploiting Spatial Invariance for Scalable Unsupervised Object Tracking," In Proceedings of the AAAI Conference on Artificial Intelligence, 2020, pp. 3684-3692.
Creswell et al., "Unsupervised Object-Based Transition Models for 3D Partially Observable Environments," arXiv:2103.04693v1, Mar. 8, 2021, 14 pages.
Deng et al., "ImageNet: A Large-Scale Hierarchical Image Database," IEEE Computer Society Conference on Computer Vision and Pattern Recognition, Jun. 2009, 8 pages.
Didolkar et al., "Neural Production Systems," 35th Conference on Neural Information Processing Systems, arXiv:2103.01937v3, Mar. 23, 2022, 26 pages.
Ding et al., "Attention over learned object embeddings enables complex visual reasoning," 35th Conference on Neural Information Processing Systems, Sydney, Australia, arXiv:2012.08508v3, 2021, 23 pages.
Ding et al., "Dynamic Visual Reasoning by Learning Differentiable Physics Models from Video and Language," 35th Conference on Neural Information Processing Systems, Sydney, Australia, arXiv:2110.15358v1, Oct. 28, 2021, 21 pages.
Du et al., "Unsupervised Learning of Compositional Energy Concepts," 35th Conference on Neural Information Processing Systems, arXiv:2111.03042v1, Nov. 4, 2021, 15 pages.
Du et al., "Unsupervised Discovery of 3D Physical Objects from Video," In International Conference on Learning Representations, arXiv:2007.12348v3, Mar. 23, 2021, 15 pages.
Engelcke et al., "GENESIS: Generative Scene Inference and Sampling with Object-Centric Latent Representations," International Conference on Learning Representations, arXiv:1907.13052v4, Nov. 23, 2020, 17 pages.
Eslami et al., "Attend, Infer, Repeat: Fast Scene Understanding with Generative Models," In Advances in Neural Information Processing Systems, 2016, pp. 3225-3233.
Faktor et al., "Video segmentation by Non-Local Consensus Voting," In Proceedings of the British Machine Vision Conference, 2014, 12 pages.
Fuchs et al., "End-to-end Recurrent Multi-Object Tracking and Trajectory Prediction with Relational Reasoning," arXiv:1907.12887v5, Sep. 28, 2020, 14 pages.
Girdhar et al., CATER: A Diagnostic Dataset for Compositional Actions and Temporal Reasoning, arXiv:1910.04744v2, Apr. 5, 2020, 16 pages.
Girdhar et al., Video Action Transformer Network. In Proceedings of the IEEE Conference on Computer Vision and Pattern Recognition, arXiv:1812.02707v2, May 17, 2019, 10 pages.
Google Research, Google scanned objects, URL ttps://app.ignitionrobotics.org/GoogleResearch/fuel/collections/Google%20Scanned%20Objects, 8 pages.
Goyal et al., "Factorizing Declarative and Procedural Knowledge in Structured, Dynamic Environments," In International Conference on Learning Representations, 2021, 24 pages.
Goyal et al., "Recurrent Independent Mechanisms," In International Conference on Learning Representations, 2021, 37 pages.
Greff et al., "Tagger: Deep Unsupervised Perceptual Grouping," 30th Conference on Neural Information Processing Systems, Spain, 2016, 19 pages.
Greff et al., "Neural Expectation Maximization," 31st Conference on Neural Information Processing Systems, 2017, 11 pages.
Greff et al., "Multi-Object Representation Learning with Iterative Variational Inference," Proceedings of the 36th International Conference on Machine Learning, arXiv:1903.00450v3, 2019, 28 pages.
Greff et al., "On the Binding Problem in Artificial Neural Networks," arXiv preprint arXiv:2012.05208v1, Dec. 9, 2020.
Greff et al., "Kubric: A Data Generation Pipeline for Creating Semi-Realistic Synthetic Multi-Object Videos," URL https://github.com/google-research/kubric, 2021, 5 pages.
Gupta et al., "Towards General Purpose Vision Systems," arXiv:2104.00743, 2021, 13 pages.
Harley et al., "Track, Check, Repeat: An EM Approach to Unsupervised Tracking," arXiv:2104.03424v1, Apr. 7, 2021, 12 pages.
He et al., Deep Residual Learning for Image Recognition, In Proceedings of the IEEE conference on Computer Vision and Pattern Recognition, arXiv:1512.03385v1, Dec. 10, 2015.
Heek et al., "Flax: A neural network library and ecosystem for JAX designed for flexibility," URL http://github.com/google/flax, 2020, 6 pages.
Henderson et al., "Unsupervised object-centric video generation and decomposition in 3D," 34th Conference on Neural Information Processing Systems, 2020, 32 pages.
Herzig et al., "Spatio-Temporal Action Graph Networks," arXiv preprint arXiv:1812.01233v2, Sep. 29, 2019, 12 pages.
Hinton et al., "Matrix Capsules with EM Routing," In International Conference on Learning Representations, 2018, 15 pages.
Isack et al., "Energy-based Geometric Multi-Model Fitting," International Journal of Computer Vision, 2012, pp. 123-147, vol. 97, No. 2.
Jabri et al., "Space-Time Correspondence as a Contrastive Random Walk," In Advances in Neural Information Processing Systems, In International Conference on Learning Representations, arXiv:2006.14613v2, 2020, 20 pages.
Jaegle et al., "Perceiver IO: A General Architecture for Structured Inputs & Outputs," In International Conference on Learning Representations 2022, arXiv:2107.14795v3, Mar. 15, 2022, 29 pages.
Jaegle et al., "Perceiver: General Perception with Iterative Attention," In International Conference on Machine Learning, arXiv:2103.03206v2, Jun. 23, 2021.
Jain et al., Structural-RNN: Deep Learning on Spatio-Temporal Graphs, In Proceedings of the IEEE Conference on Computer Vision and Pattern Recognition, arXiv:1511.05298v3, Apr. 11, 2016, 10 pages.
Chinese Patent Office, Office Action mailed Dec. 31, 2024, issued in connection with Chinese Patent Application No. 202210585538.8, 15 pages.
Meinhardt et al., "TrackFormer: Multi-Object Tracking with Transformers," arXiv:2101.02702v1, Jan. 7, 2021, 14 pages.

* cited by examiner

CONDITIONAL OBJECT-CENTRIC LEARNING WITH SLOT ATTENTION FOR VIDEO AND OTHER SEQUENTIAL DATA

CROSS-REFERENCE TO RELATED APPLICATIONS

This application claims priority to U.S. provisional patent application No. 63/194,425, filed on May 28, 2021, which is hereby incorporated by reference as if fully set forth in this description.

BACKGROUND

Machine Learning models may be used to process various types of data, including images, video, time series, text, and/or point clouds, among other possibilities. Improvements in the machine learning models allow the models to carry out the processing of data faster and/or utilize fewer computing resources for the processing.

SUMMARY

In a first example embodiment, a method may include obtaining a first plurality of feature vectors that represent contents of a first input frame of an input data sequence and a second plurality of feature vectors that represent contents of a second input frame of the input data sequence. The second input frame may be subsequent to the first input frame. The method may also include generating, based on the first plurality of feature vectors and by a slot vector model, a first plurality of slot vectors. Each respective slot vector of the first plurality of slot vectors may represent attributes of a corresponding entity as represented in the first input frame. The method may additionally include generating, based on the first plurality of slot vectors and by a predictor model, a plurality of predicted slot vectors that includes, for each respective slot vector of the first plurality of slot vectors, a corresponding predicted slot vector. The corresponding predicted slot vector may represent a transition of the attributes of the corresponding entity from the first input frame to the second input frame. The method may further include generating, based on the plurality of predicted slot vectors and the second plurality of feature vectors and by the slot vector model, a second plurality of slot vectors that includes, for each respective slot vector of the first plurality of slot vectors, a corresponding slot vector. The corresponding slot vector may represent the attributes of the corresponding entity as represented in the second input frame. The method may yet further include determining an output based on one or more of: (i) at least one predicted slot vector of the plurality of predicted slot vectors or (ii) at least one slot vector of the second plurality of slot vectors.

In a second example embodiment, a system may include a processor and a non-transitory computer-readable medium having stored thereon instructions that, when executed by the processor, cause the processor to perform operations. The operations may include obtaining a first plurality of feature vectors that represent contents of a first input frame of an input data sequence and a second plurality of feature vectors that represent contents of a second input frame of the input data sequence. The second input frame may be subsequent to the first input frame. The operations may also include generating, based on the first plurality of feature vectors and by a slot vector model, a first plurality of slot vectors. Each respective slot vector of the first plurality of slot vectors may represent attributes of a corresponding entity as represented in the first input frame. The operations may additionally include generating, based on the first plurality of slot vectors and by a predictor model, a plurality of predicted slot vectors that includes, for each respective slot vector of the first plurality of slot vectors, a corresponding predicted slot vector. The corresponding predicted slot vector may represent a transition of the attributes of the corresponding entity from the first input frame to the second input frame. The operations may further include generating, based on the plurality of predicted slot vectors and the second plurality of feature vectors and by the slot vector model, a second plurality of slot vectors that includes, for each respective slot vector of the first plurality of slot vectors, a corresponding slot vector. The corresponding slot vector may represent the attributes of the corresponding entity as represented in the second input frame. The operations may yet further include determining an output based on one or more of: (i) at least one predicted slot vector of the plurality of predicted slot vectors or (ii) at least one slot vector of the second plurality of slot vectors.

In a third example embodiment, a non-transitory computer-readable medium may have stored thereon instructions that, when executed by a computing device, cause the computing device to perform operations. The operations may include obtaining a first plurality of feature vectors that represent contents of a first input frame of an input data sequence and a second plurality of feature vectors that represent contents of a second input frame of the input data sequence. The second input frame may be subsequent to the first input frame. The operations may also include generating, based on the first plurality of feature vectors and by a slot vector model, a first plurality of slot vectors. Each respective slot vector of the first plurality of slot vectors may represent attributes of a corresponding entity as represented in the first input frame. The operations may additionally include generating, based on the first plurality of slot vectors and by a predictor model, a plurality of predicted slot vectors that includes, for each respective slot vector of the first plurality of slot vectors, a corresponding predicted slot vector. The corresponding predicted slot vector may represent a transition of the attributes of the corresponding entity from the first input frame to the second input frame. The operations may further include generating, based on the plurality of predicted slot vectors and the second plurality of feature vectors and by the slot vector model, a second plurality of slot vectors that includes, for each respective slot vector of the first plurality of slot vectors, a corresponding slot vector. The corresponding slot vector may represent the attributes of the corresponding entity as represented in the second input frame. The operations may yet further include determining an output based on one or more of: (i) at least one predicted slot vector of the plurality of predicted slot vectors or (ii) at least one slot vector of the second plurality of slot vectors.

In a fourth example embodiment, a system may include means for obtaining (i) a first plurality of feature vectors that represent contents of a first input frame of an input data sequence and (ii) a second plurality of feature vectors that represent contents of a second input frame of the input data sequence. The second input frame may be subsequent to the first input frame. The system may also include means for generating, based on the first plurality of feature vectors, a first plurality of slot vectors. Each respective slot vector of the first plurality of slot vectors may represent attributes of a corresponding entity as represented in the first input frame. The system may additionally include means for generating, based on the first plurality of slot vectors, a plurality of predicted slot vectors that includes, for each respective slot vector of the first plurality of slot vectors, a corresponding predicted slot vector. The corresponding predicted slot vector may represent a transition of the attributes of the corresponding entity from the first input frame to the second input frame. The system may further include means for generating, based on the plurality of predicted slot vectors and the second plurality of feature vectors, a second plurality of slot vectors that includes, for each respective slot vector of the first plurality of slot vectors, a corresponding slot vector. The corresponding slot vector may represent the attributes of the corresponding entity as represented in the second input frame. The system may yet further include means for determining an output based on one or more of: (i) at least one predicted slot vector of the plurality of predicted slot vectors or (ii) at least one slot vector of the second plurality of slot vectors.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
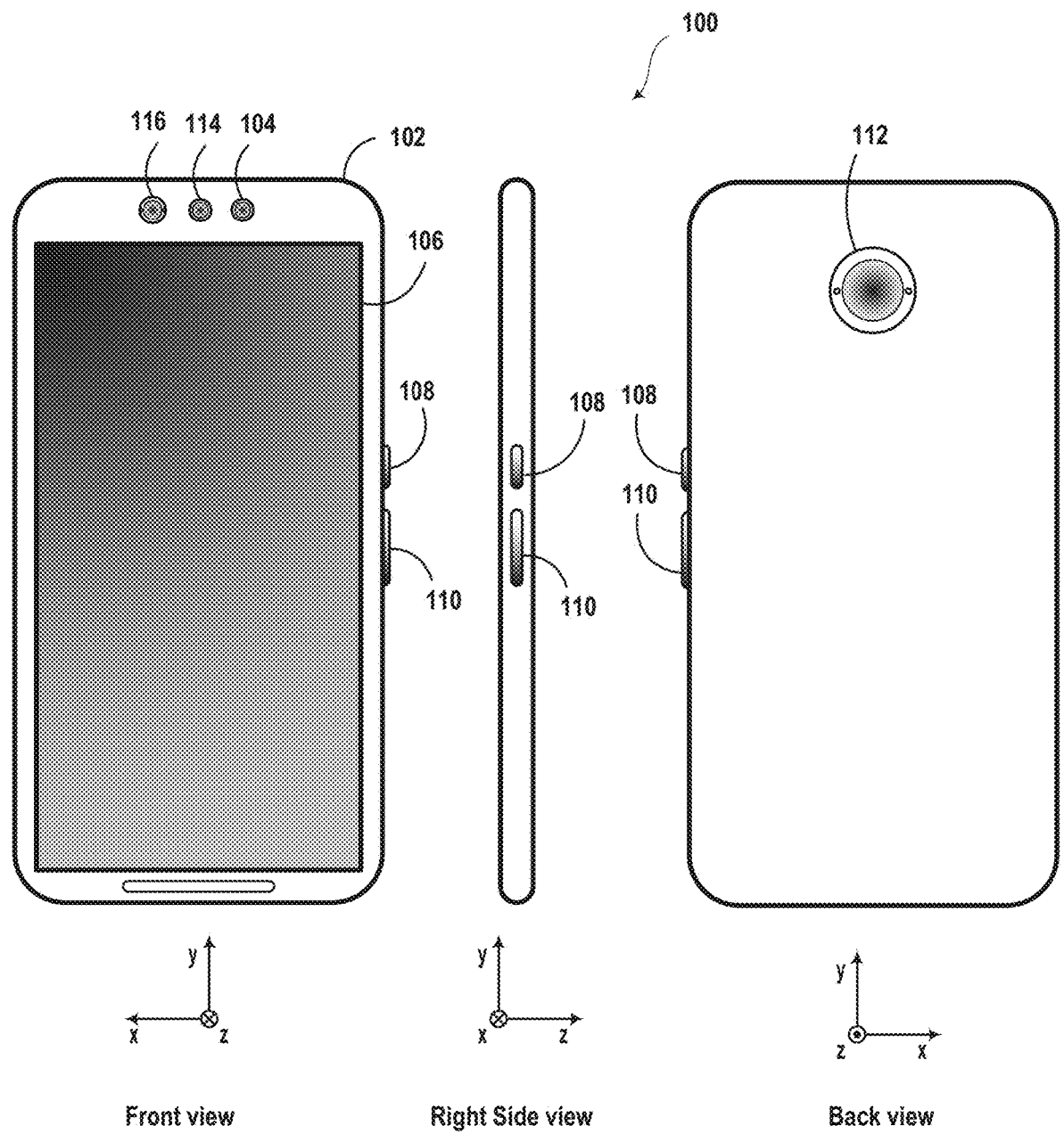
FIG. 1 illustrates a computing system, in accordance with examples described herein.

Example methods, devices, and systems are described herein. It should be understood that the words "example" and "exemplary" are used herein to mean "serving as an example, instance, or illustration." Any embodiment or feature described herein as being an "example," "exemplary," and/or "illustrative" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order. Unless otherwise noted, figures are not drawn to scale.

I. Overview

A slot attention model may be configured to determine entity-centric (e.g., object-centric) representations of entities contained in a perceptual representation on the basis of a distributed representation of the perceptual representation. An example perceptual representation may take the form of an image that contains therein one or more entities such as objects, surfaces, regions, backgrounds, or other environmental features. Machine learning models may be configured to generate the distributed representation of the image. For example, one or more convolutional neural networks may be configured to process the image and generate one or more convolutional feature maps, which may represent the output of various feature filters implemented by the one or more convolutional neural networks.

These convolutional feature maps may be considered a distributed representation of the entities in the image because the features represented by the feature maps are related to different portions along the image area, but are not directly/explicitly associated with any of the entities represented in the image data. On the other hand, an object-centric representation may associate one or more features with individual entities represented in the image data. Thus, for example, each feature in a distributed representation may be associated with a corresponding portion of the perceptual representation, while each feature in an entity-centric representation may be associated with a corresponding entity contained in the perceptual representation.

Accordingly, the slot attention model may be configured to generate a plurality of entity-centric representations, referred to herein as slot vectors, based on a plurality of distributed representations, referred to herein as feature vectors. Each slot vector may be an entity-specific semantic embedding that represents the attributes or properties of one or more corresponding entities. The slot attention model may thus be considered to be an interface between perceptual representations and a structured set of variables represented by the slot vectors.

The slot attention model may include a neural network memory unit, such as a gated recurrent unit (GRU) or a long-short term memory (LSTM) neural network, configured to store and update the plurality of slot vectors across iterations of processing the feature vectors by the slot attention model. Parameters of the neural network memory unit may be learned during training of the slot attention model. The plurality of slot vectors may be initialized with values prior to a first iteration of processing by the slot attention model. In one example, the plurality of slot vectors may be initialized with random values selected, for example, from a normal distribution. In other implementations, the plurality of slot vectors may be initialized with values that cause one or more of the slot vectors to bind to and/or attach to particular entities (e.g., based on the values of previously-determined slot vectors). Thus, a particular slot vector may be caused to represent the same entity across successive perceptual representations (e.g., successive video frames or successive sections of audio waveforms) by initializing the particular slot vector with values of the particular slot vector previously determined with respect to one or more preceding perceptual representations.

The slot attention model may also include learned value, key, and query functions. The slot attention model may be configured to calculate an attention matrix based on a dot product of (i) the plurality of feature vectors transformed by the key function and (ii) the plurality of slot vectors transformed by the query function. Entries of the attention matrix may be normalized by way of a softmax function along a dimension corresponding to the slot vectors, thus causing the slot vectors to compete with one another for representing the entities contained in the perceptual representation. For example, when the number of slot vectors corresponds to a number of columns of the attention matrix, each value within each respective row of the attention matrix may be normalized with respect to values within the respective row by way of the softmax function. On the other hand, when the number of slot vectors corresponds to a number of rows of the attention matrix, each value within each respective column of the attention matrix may be normalized with respect to values within the respective column by way of the softmax function.

The slot attention model may also be configured to calculate an update matrix based on (i) the attention matrix and (ii) the plurality of feature vectors transformed by the value function. The neural network memory unit may be configured to update the plurality of slot vectors based on the update matrix and previous values of the slot vectors, thereby allowing the values of the slot vectors to be refined to improve their representational accuracy over one or more iterations of the slot attention model.

The slot vectors generated by the slot attention model may be permutation invariant with respect to the feature vectors and permutation equivariant with respect to one another. Thus, for a given initialization of the slot vectors, the order of the feature vectors of a given perceptual representation might not influence the values of the slot vectors and/or the order of the values of the slot vectors. Different initializations of the slot vectors may, for a given perceptual representation, change the order of the slot vectors, while the set of values of the slot vectors remains approximately constant. Thus, permuting the order of the slot vectors after initialization thereof may be equivalent to permuting the output of the slot attention model. The permutation equivariance of the slot vectors with respect to one another allows the slot vectors to be fully interchangeable and allows each slot vector to represent various entities independently of their types, classifications, and/or semantics.

The plurality of slot vectors may be used by one or more machine learning models to perform specific tasks, such as image reconstruction, text translation, object attribute/property detection, reward prediction, visual reasoning, question answering, control, and/or planning, among other possible tasks. Thus, the slot attention model may be trained jointly with the one or more machine learning models to generate slot vectors that are useful in carrying out the particular task of the one or more machine learning models. That is, the slot attention model may be trained to generate the slot vectors in a task-specific manner, such that the slot vectors represent the information important for the particular task and omit information that is not important and/or irrelevant for the particular task.

Although the slot attention model may be trained for a specific task, the architecture of the slot attention model is not task-specific and thus allows the slot attention model to be used for various tasks. The slot attention model may be used for both supervised and unsupervised training tasks. Additionally, the slot attention model does not assume, expect, or depend on the feature vectors representing a particular type of data (e.g., image data, waveform data, text data, etc.). Thus, the slot attention model may be used with any type of data that can be represented by one or more feature vectors, and the type of data may be based on the task for which the slot attention model is used.

Further, the slot vectors themselves might not be specialized with respect to particular entity types and/or classifications. Thus, when multiple classes of entities are contained within the perceptual representation, each slot vector may be capable of representing each of the entities, regardless of its class. Each of the slot vectors may bind to or attach to a particular entity in order to represent its features, but this binding/attending is not dependent on entity type, classification, and/or semantics. The binding/attending of a slot vector to an entity may be driven by the downstream task for which the slot vectors are used—the slot attention model might not be "aware" of objects per-se, and might not distinguish between, for example, clustering objects, colors, and/or spatial regions.

Entity-centric representations (e.g., slot vectors) of features present within an input data sequence may be generated, tracked, and/or updated based on multiple input frames of the input data sequence. For example, slot vectors representing objects present in a video may be generated, tracked, and/or updated across different image frames of the video. Specifically, rather than processing each input frame independently, the input frames may be processed as a sequence, with prior slot vectors providing information that may be useful in generating subsequent slot vectors. Accordingly, the slot vectors generated for the input data sequence may be temporally-coherent, with a given slot representing the same entity and/or feature across multiple input frames of the input data sequence.

Such temporally-coherent slot vectors may be generated using a system that includes an encoder model, a slot vector model (alternatively referred to as a corrector), and a predictor model. The encoder model may be configured to generate feature vectors (e.g., distributed representations) that represent the contents of different input frames of the input data sequence. For example, the encoder model may be configured to generate, for each respective input frame of a plurality of input frames of the input data sequence, a corresponding set of feature vectors that represent the contents of the respective input frame. The slot vector model may be configured to process the feature vectors of a corresponding input frame and, based thereon, generate a plurality of slot vectors for the corresponding input frame. The predictor model may be configured to process the plurality of slot vectors of a given input frame and, based thereon, generate a plurality of predicted slot vectors for a subsequent frame.

Specifically, the predictor model may be trained to model the dynamics and/or interactions of the entities represented by the plurality of slot vectors, and thus forecast the state of these entities in a subsequent input frame (e.g., at a future time). For example, in the context of video, the predictor model may be configured to predict, based on a current state of objects in a scene (as represented by the slot vectors), a future state of the objects in the scene (as represented by the predicted slot vectors). The slot vector model may also be configured to process the predicted slot vectors generated for a particular (e.g., future) input frame, along with feature vectors corresponding to the particular input frame, and, based thereon, generate another plurality of slot vectors corresponding to the particular input frame. That is, the slot vector model may be configured to refine, correct, and/or update the information contained in the predicted slot vectors based on information contained in the feature vectors, thus allowing information about entity attributes to be aggregated and updated over time.

Accordingly, by using the predictor model in combination with the slot vector model, the slot vectors generated for a given input frame may borrow/utilize information from slot vectors for prior input frames, resulting in more accurate slot vectors being generated using as little as one iteration of the slot vector model. Additionally, the predictor model may be used to generate predicted slot vectors for multiple time steps into the future, thus allowing the slot attention model to generate a set of slot vectors every n≥2 input frames, rather than for every input frame, which may allow the system to reduce its usage of computational resources. Further, the predictor model may allow the system to handle the absence from some input frames of a previously-present entity, such as due to occlusions and/of movement of the previously-seen entity, by indicating this absence using the predicted slot vector.

Additionally, the system may include an initializer model configured to generate a plurality of initialization slot vectors configured to deterministically bind a given slot to a target entity. Specifically, the slot vector model may be configured to process the initialization slot vectors and the feature vectors of an initial input frame of the input data sequence to generate the slot vectors corresponding to the initial input frame. Each respective slot vector for the initial frame may bind to the entity indicated by a corresponding initialization slot vector. The initializer model may be configured to obtain, for at least some of the initialization slot vectors, an indication of the corresponding entity that is to be represented by the corresponding slot vector (alternatively referred to as a conditional input), with any remaining initialization vectors being initialized randomly. For example, when a video represents three objects, a first object may be assigned to a first slot, a second object may be assigned to a second slot, and a third object may be assigned to a third slot, resulting in slot vectors of the first slot representing the first object, slot vectors of the second slot representing the second object, and slot vectors of the third slot representing the third object.

The indication of the corresponding entity may be a bounding box that at least partially outlines the entity within at least the initial input frame of the input data sequence, coordinates (e.g., center of mass coordinates) associated with the entity within at least the initial input frame, and/or a segmentation mask that outlines a shape of the entity within at least the initial input frame, among other possibilities. In general, the indication of the corresponding entity may be a region of a space defined by the initial input frame, where the region is associated with the corresponding entity. The initializer model may be implemented as, for example, a multi-layer perceptron or a convolutional neural network, depending on the format of the indication of the corresponding entity.

Alternatively, in some implementations, the plurality of slot vectors may be learned during training, and held fixed during inference. For example, the same learned plurality of slot vectors may be used independently of the input data sequence.

The system may be trained to generate useful slot vectors and predicted slot vectors using a decoder configured to reconstruct, for example, the input frames of the input data sequence or flow vector fields associated with the input frames. For example, in the case of video, the system may be trained using an image reconstruction loss and/or an optical flow reconstruction loss. The reconstructed optical flow of a given image may be represented as, for example, a color image, with the magnitude and direction of the optical flow at a given pixel represented by a color of the pixel. Using the optical flow reconstruction loss may facilitate training and result in a model that is more accurately able to distinguish between different objects and/or features, since the motion indicated by the optical flow informs entity-centric representations in that related features generally move together, while unrelated features do not. In particular, the optical flow reconstruction loss may adapt the system to accurately distinguish scenes and/or features containing complex textures.

The decoder used in training may subsequently be replaced with a different, task-specific decoder or other machine learning model. This task-specific decoder may be trained to interpret the slot vectors generated by the system in the context of a particular task and generate task-specific outputs, thus allowing the system to be used in various contexts and applications. In one example, the particular task may include controlling a robotic device, and so the task-specific decoder may thus be trained to use the information represented by the slot vectors to facilitate controlling the robotic device. In another example, the particular task may include operating an autonomous vehicle, and so the task-specific decoder may thus be trained to use the information represented by the slot vectors to facilitate operating the autonomous vehicle. Additionally, since the system operates on feature vectors, any input data sequence from which feature vectors can be generated may be processed by the system. Thus, in addition to video, the system may be applied to, and/or may be used to generate as output, point cloud sequences, waveforms (e.g., audio waveforms represented as spectrograms), text, sequences of RADAR data, and/or other computer-generated and/or human-generated sequential data.

II. Example Computing Devices

FIG. 1 illustrates an example form factor of computing system 100. Computing system 100 may be, for example, a mobile phone, a tablet computer, or a wearable computing device. However, other embodiments are possible. Computing system 100 may include various elements, such as body 102, display 106, and buttons 108 and 110. Computing system 100 may further include front-facing camera 104, rear-facing camera 112, front-facing infrared camera 114, and infrared pattern projector 116.

Front-facing camera 104 may be positioned on a side of body 102 typically facing a user while in operation (e.g., on the same side as display 106). Rear-facing camera 112 may be positioned on a side of body 102 opposite front-facing camera 104. Referring to the cameras as front and rear facing is arbitrary, and computing system 100 may include multiple cameras positioned on various sides of body 102. Front-facing camera 104 and rear-facing camera 112 may each be configured to capture images in the visible light spectrum.

Display 106 could represent a cathode ray tube (CRT) display, a light emitting diode (LED) display, a liquid crystal (LCD) display, a plasma display, an organic light emitting diode (OLED) display, or any other type of display known in the art. In some embodiments, display 106 may display a digital representation of the current image being captured by front-facing camera 104, rear-facing camera 112, and/or infrared camera 114, and/or an image that could be captured or was recently captured by one or more of these cameras. Thus, display 106 may serve as a viewfinder for the cameras. Display 106 may also support touchscreen functions that may be able to adjust the settings and/or configuration of any aspect of computing system 100.

Front-facing camera 104 may include an image sensor and associated optical elements such as lenses. Front-facing camera 104 may offer zoom capabilities or could have a fixed focal length. In other embodiments, interchangeable lenses could be used with front-facing camera 104. Front-facing camera 104 may have a variable mechanical aperture and a mechanical and/or electronic shutter. Front-facing camera 104 also could be configured to capture still images, video images, or both. Further, front-facing camera 104 could represent a monoscopic, stereoscopic, or multiscopic camera. Rear-facing camera 112 and/or infrared camera 114 may be similarly or differently arranged. Additionally, one or more of front-facing camera 104, rear-facing camera 112, or infrared camera 114, may be an array of one or more cameras.

Either or both of front-facing camera 104 and rear-facing camera 112 may include or be associated with an illumination component that provides a light field in the visible light spectrum to illuminate a target object. For instance, an illumination component could provide flash or constant illumination of the target object. An illumination component could also be configured to provide a light field that includes one or more of structured light, polarized light, and light with specific spectral content. Other types of light fields known and used to recover three-dimensional (3D) models from an object are possible within the context of the embodiments herein.

Infrared pattern projector 116 may be configured to project an infrared structured light pattern onto the target object. In one example, infrared projector 116 may be configured to project a dot pattern and/or a flood pattern. Thus, infrared projector 116 may be used in combination with infrared camera 114 to determine a plurality of depth values corresponding to different physical features of the target object.

Namely, infrared projector 116 may project a known and/or predetermined dot pattern onto the target object, and infrared camera 114 may capture an infrared image of the target object that includes the projected dot pattern. Computing system 100 may then determine a correspondence between a region in the captured infrared image and a particular part of the projected dot pattern. Given a position of infrared projector 116, a position of infrared camera 114, and the location of the region corresponding to the particular part of the projected dot pattern within the captured infrared image, computing system 100 may then use triangulation to estimate a depth to a surface of the target object. By repeating this for different regions corresponding to different parts of the projected dot pattern, computing system 100 may estimate the depth of various physical features or portions of the target object. In this way, computing system 100 may be used to generate a three-dimensional (3D) model of the target object.

Computing system 100 may also include an ambient light sensor that may continuously or from time to time determine the ambient brightness of a scene (e.g., in terms of visible and/or infrared light) that cameras 104, 112, and/or 114 can capture. In some implementations, the ambient light sensor can be used to adjust the display brightness of display 106. Additionally, the ambient light sensor may be used to determine an exposure length of one or more of cameras 104, 112, or 114, or to help in this determination.

Computing system 100 could be configured to use display 106 and front-facing camera 104, rear-facing camera 112, and/or front-facing infrared camera 114 to capture images of a target object. The captured images could be a plurality of still images or a video stream. The image capture could be triggered by activating button 108, pressing a softkey on display 106, or by some other mechanism. Depending upon the implementation, the images could be captured automatically at a specific time interval, for example, upon pressing button 108, upon appropriate lighting conditions of the target object, upon moving computing system 100 a predetermined distance, or according to a predetermined capture schedule.

Figure 2:
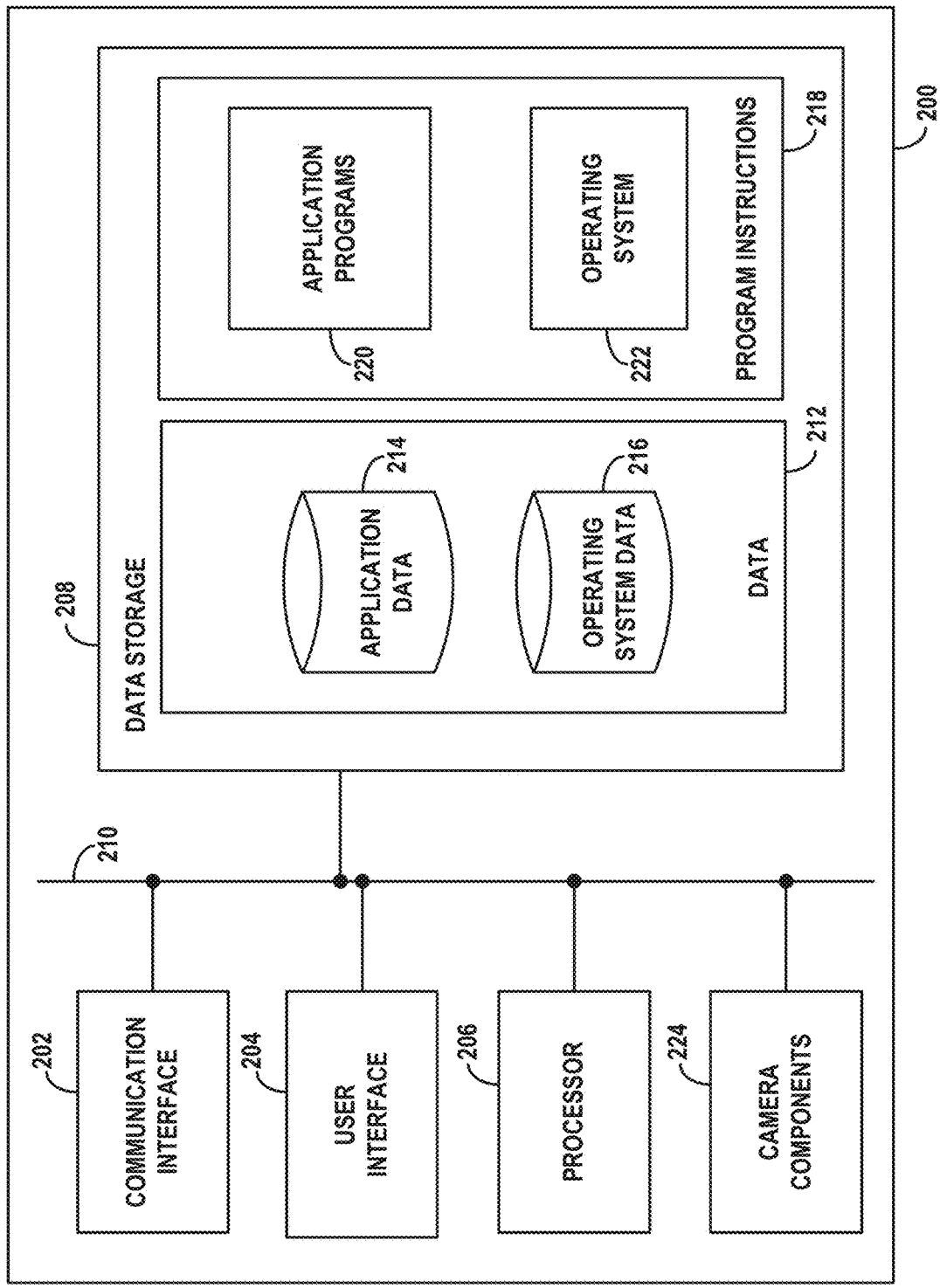
FIG. 2 illustrates a computing device, in accordance with examples described herein.

As noted above, the functions of computing system 100 may be integrated into a computing device, such as a wireless computing device, cell phone, tablet computer, laptop computer and so on. For purposes of example, FIG. 2 is a simplified block diagram showing some of the components of an example computing device 200 that may include camera components 224.

By way of example and without limitation, computing device 200 may be a cellular mobile telephone (e.g., a smartphone), a still camera, a video camera, a computer (such as a desktop, notebook, tablet, or handheld computer), personal digital assistant (PDA), a home automation component, a digital video recorder (DVR), a digital television, a remote control, a wearable computing device, a gaming console, a robotic device, or some other type of device. As shown in FIG. 2, computing device 200 may include communication interface 202, user interface 204, processor 206, data storage 208, and camera components 224, all of which may be communicatively linked together by a system bus, network, or other connection mechanism 210.

Communication interface 202 may allow computing device 200 to communicate, using analog or digital modulation, with other devices, access networks, and/or transport networks. Thus, communication interface 202 may facilitate circuit-switched and/or packet-switched communication, such as plain old telephone service (POTS) communication and/or Internet protocol (IP) or other packetized communication. For instance, communication interface 202 may include a chipset and antenna arranged for wireless communication with a radio access network or an access point. Also, communication interface 202 may take the form of or include a wireline interface, such as an Ethernet, Universal Serial Bus (USB), or High-Definition Multimedia Interface (HDMI) port. Communication interface 202 may also take the form of or include a wireless interface, such as a BLUETOOTH®, global positioning system (GPS), or wide-area wireless interface (e.g., WiMAX or 3GPP Long-Term Evolution (LTE)). However, other forms of physical layer interfaces and other types of standard or proprietary communication protocols may be used over communication interface 202. Furthermore, communication interface 202 may comprise multiple physical communication interfaces (e.g., a Wi-Fi interface, a BLUETOOTH® interface, and a wide-area wireless interface).

User interface 204 may function to allow computing device 200 to interact with a human or non-human user, such as to receive input from a user and to provide output to the user. Thus, user interface 204 may include input components such as a keypad, keyboard, touch-sensitive panel, computer mouse, trackball, joystick, microphone, and so on. User interface 204 may also include one or more output components such as a display screen which, for example, may be combined with a touch-sensitive panel. The display screen may be based on CRT, LCD, and/or LED technologies, or other technologies now known or later developed. User interface 204 may also be configured to generate audible output(s), via a speaker, speaker jack, audio output port, audio output device, earphones, and/or other similar devices. User interface 204 may also be configured to receive and/or capture audible utterance(s), noise(s), and/or signal(s) by way of a microphone and/or other similar devices.

In some embodiments, user interface 204 may include a display that serves as a viewfinder for still camera and/or video camera functions supported by computing device 200 (e.g., in both the visible and infrared spectrum). Additionally, user interface 204 may include one or more buttons, switches, knobs, and/or dials that facilitate the configuration and focusing of a camera function and the capturing of images. It may be possible that some or all of these buttons, switches, knobs, and/or dials are implemented by way of a touch-sensitive panel.

Processor 206 may comprise one or more general purpose processors—e.g., microprocessors—and/or one or more special purpose processors—e.g., digital signal processors (DSPs), graphics processing units (CPUs), floating point units (FPUs), network processors, or application-specific integrated circuits (ASICs). In some instances, special purpose processors may be capable of image processing, image alignment, and merging images, among other possibilities. Data storage 208 may include one or more volatile and/or non-volatile storage components, such as magnetic, optical, flash, or organic storage, and may be integrated in whole or in part with processor 206. Data storage 208 may include removable and/or non-removable components.

Processor 206 may be capable of executing program instructions 218 (e.g., compiled or non-compiled program logic and/or machine code) stored in data storage 208 to carry out the various functions described herein. Therefore, data storage 208 may include a non-transitory computer-readable medium, having stored thereon program instructions that, upon execution by computing device 200, cause computing device 200 to carry out any of the methods, processes, or operations disclosed in this specification and/or the accompanying drawings. The execution of program instructions 218 by processor 206 may result in processor 206 using data 212.

By way of example, program instructions 218 may include an operating system 222 (e.g., an operating system kernel, device driver(s), and/or other components) and one or more application programs 220 (e.g., camera functions, address book, email, web browsing, social networking, audio-to-text functions, text translation functions, and/or gaming applications) installed on computing device 200. Similarly, data 212 may include operating system data 216 and application data 214. Operating system data 216 may be accessible primarily to operating system 222, and application data 214 may be accessible primarily to one or more of application programs 220. Application data 214 may be arranged in a file system that is visible to or hidden from a user of computing device 200.

Application programs 220 may communicate with operating system 222 through one or more application programming interfaces (APIs). These APIs may facilitate, for instance, application programs 220 reading and/or writing application data 214, transmitting or receiving information via communication interface 202, receiving and/or displaying information on user interface 204, and so on. In some vernaculars, application programs 220 may be referred to as "apps" for short. Additionally, application programs 220 may be downloadable to computing device 200 through one or more online application stores or application markets. However, application programs can also be installed on computing device 200 in other ways, such as via a web browser or through a physical interface (e.g., a USB port) on computing device 200.

Camera components 224 may include, but are not limited to, an aperture, shutter, recording surface (e.g., photographic film and/or an image sensor), lens, shutter button, infrared projectors, and/or visible-light projectors. Camera components 224 may include components configured for capturing of images in the visible-light spectrum (e.g., electromagnetic radiation having a wavelength of 400-700 nanometers) and components configured for capturing of images in the infrared light spectrum (e.g., electromagnetic radiation having a wavelength of 701 nanometers-1 millimeter). Camera components 224 may be controlled at least in part by software executed by processor 206.

III. Example Slot Attention Model

Figure 3:
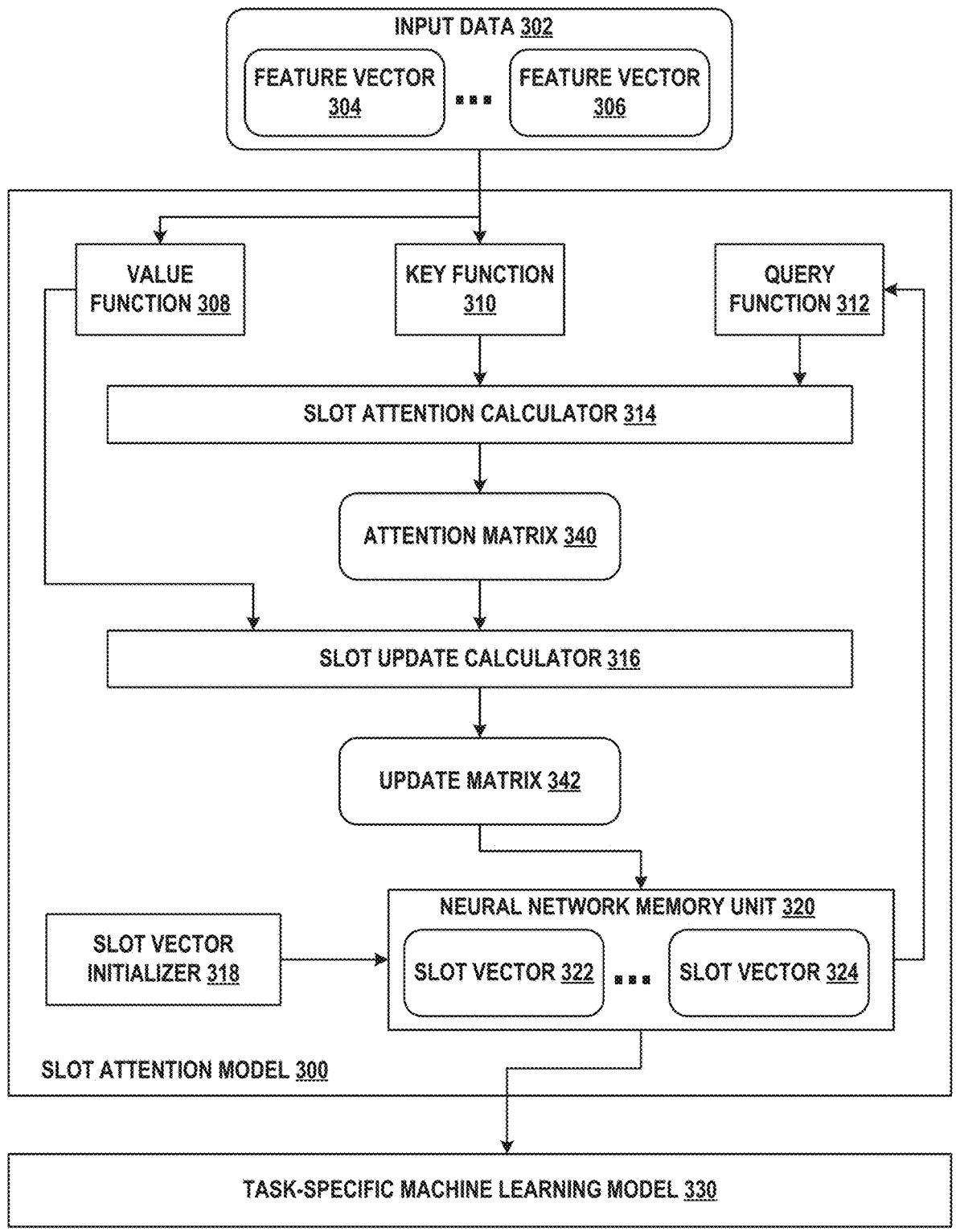
FIG. 3 illustrates a slot attention model, in accordance with examples described herein.

FIG. 3 illustrates a block diagram of slot attention model 300. Slot attention model 300 may include value function 308, key function 310, query function 312, slot attention calculator 314, slot update calculator 316, slot vector initializer 318, and neural network memory unit 320. Slot attention model 300 may be configured to receive input data 302 as input, which may include feature vectors 304-306. Input data 302 may alternatively be referred to as a perceptual representation. Input data 302 may correspond to and/or represent an input frame of an input data sequence.

Slot attention model 300 may be configured to generate slot vectors 322-324 based on input data 302. Feature vectors 304-306 may represent a distributed representation of the entities in input data 302, while slot vectors 322-324 may represent an entity-centric representation of these entities. Slot attention model 300 and the components thereof may represent a combination of hardware and/or software components configured to implement the functions described herein. Slot vectors 322-324 may collectively define latent representation of input data 302. In some cases, the latent representation may represent a compression of the information contained in input data 302. Thus, in some implementations, slot attention model 300 may be used as and/or viewed as a machine learning encoder. Accordingly, slot attention model 300 may be used for image reconstruction, text translation, and/or other applications that utilize machine learning encoders. Unlike certain other latent representations, each slot vector of this latent representation may capture the properties of corresponding one or more entities in input data 302, and may do so without relying on assumption about an order in which the entities are described by input data 302.

Input data 302 may represent various types of data, including, for example, image data (e.g., red-green-blue image data or gray scale image data), depth image data, point cloud data, audio data, time series data, and/or text data, among other possibilities. In some cases, input data 302 may be captured and/or generated by one or more sensors, such as visible light cameras (e.g., camera 104), near-infrared cameras (e.g., infrared camera 114), thermal cameras, stereoscopic cameras, time-of-flight (ToF) cameras, light detection and ranging (LIDAR) devices, radio detection and ranging (RADAR) devices, and/or microphones, among other possibilities. In other cases, input data 302 may additionally or alternatively include data generated by one or more users (e.g., words, sentences, paragraphs, and/or documents) or computing devices (e.g., rendered three-dimensional environments, time series plots), among other possibilities.

Input data 302 may be processed by way of one or more machine learning models (e.g., by an encoder model) to generate feature vectors 304-306. Each feature vector of feature vectors 304-306 may include a plurality of values, with each value corresponding to a particular dimension of the feature vector. In some implementations, the plurality of values of each feature vector may collectively represent an embedding of at least a portion of input data 302 in a vector space defined by the one or more machine learning models. When input data 302 is an image, for example, each of feature vectors 304-306 may be associated with one or more pixels in the image, and may represent the various visual features of the one or more pixels. In some cases, the one or more machine learning models used to process input data 302 may include convolutional neural networks. Accordingly, feature vectors 304-306 may represent a map of convolutional features of input data 302, and may thus include the outputs of various convolutional filters.

Each respective feature vector of feature vectors 304-306 may include a position embedding that indicates a portion of input data. 302 represented by the respective feature vector. Feature vectors 304-306 may be determined, for example, by adding the position embedding to the convolutional features extracted from input data 302. Encoding the position associated with each respective feature vector of feature vectors 304-306 as part of the respective feature vector, rather than by way of the order in which the respective feature vector is provided to slot attention model 300, allows feature vectors 304-306 to be provided to slot attention model 300 in a plurality of different orders. Thus, including the position embeddings as part of feature vectors 304-306 enables slot vectors 322-324 generated by slot attention model 300 to be permutation invariant with respect to feature vectors 304-306.

In the case of an image, for example, the position embedding may be generated by constructing a W×H×4 tensor, where W and H represent the width and height, respectively, of the map of the convolutional features of input data 302. Each of the four values associated with each respective pixel along the W×H map may represent a position of the respective pixel relative to a border, boundary, and/or edge of the image along a corresponding direction (i.e., up, down, right, and left) of the image. In some cases, each of the four values may be normalized to a range from 0 to 1, inclusive. The W×H×4 tensor may be projected to the same dimension as the convolutional features (i.e., the same dimension as feature vectors 304-306) by way of a learnable linear map. The projected W×H×4 tensor may then be added to the convolutional features to generate feature vectors 304-306, thereby embedding feature vectors 304-306 with positional information. In some implementations, the sum of the projected W×H×4 tensor and the convolutional features may be processed by one or more machine learning models (e.g., one or more multi-layer perceptrons) to generate feature vectors 304-306. Similar position embeddings may be included in feature vectors 304-306 for other types of perceptual representations as well.

Feature vectors 304-306 may be provided as input to key function 310. Feature vectors 304-306 may include N vectors each having I dimensions. Thus, in some implementations, feature vectors 304-306 may be represented by an input matrix X having N rows (each corresponding to a particular feature vector) and I columns.

In some implementations, key function 310 may include a linear transformation represented by a key weight matrix $W_{KEY}$ having I rows and D columns. For example, key function 310 may include a multi-layer perceptron that includes one or more hidden layers and that utilizes one or more non-linear activation functions. Key function 310 (e.g., key weight matrix $W_{KEY}$) may be learned during training of slot attention model 300. The input matrix X may be transformed by key function 310 to generate a key input matrix $X_{KEY}$ (e.g., $X_{KEY}=XW_{KEY}$), which may be provided as input to slot attention calculator 314. Key input matrix $X_{VALUE}$ may include N rows and D columns.

Feature vectors 304-306 may also be provided as input to value function 308. In some implementations, value function 308 may include a linear transformation represented by a value weight matrix $W_{VALUE}$ having I rows and D columns. For example, value function 308 may include a multi-layer perceptron that includes one or more hidden layers and that utilizes one or more non-linear activation functions. Value function 308 (e.g., value weight matrix $W_{VALUE}$) may be learned during training of slot attention model 300. The input matrix X may be transformed by value function 308 to generate a value input matrix $X_{VALUE}$ (e.g., $X_{VALUE}=XW_{VALUE}$) which may be provided as input to slot update calculator 316. Value input matrix $X_{VALUE}$ may include N rows and D columns.

Since the dimensions of key weight matrix $W_{KEY}$ and the value weight matrix $W_{VALUE}$ do not depend on the number N of feature vectors 304-306, different values of N may be used during training and during testing/usage of slot attention model 300. For example, slot attention model 300 may be trained on perceptual inputs with N=1024 feature vectors, but may be used with N=512 feature vectors or N=2048 feature vectors. However, since at least one dimension of the key weight matrix $W_{KEY}$ and the value weight matrix $W_{VALUE}$ does depend on the dimension I of feature vectors 304-306, the same value of I may be used during training and during testing/usage of slot attention model 300.

Slot vector initializer 318 may be configured to initialize each of slot vectors 322-324 stored by neural network memory unit 320. In one example, slot vector initializer 318 may be configured to initialize each of slot vectors 322-324 with random values selected, for example, from a normal (i.e., Gaussian) distribution. In other examples, slot vector initializer 318 may be configured to initialize one or more respective slot vectors of slot vectors 322-324 with "seed" values configured to cause the one or more respective slot vectors to attend/bind to, and thereby represent, a particular entity contained within input data 302. For example, when processing image frames of a video, slot vector initializer 318 may be configured to initialize slot vectors 322-324 for a second image frame based on the values of the slot vectors 322-324 determined with respect to a first image frame that precedes the second image frame. Accordingly, a particular slot vector of slot vectors 322-324 may be caused to represent the same entity across image frames of the video. Other types of sequential data may be similarly "seeded" by slot vector initializer 318.

Slot vectors 322-324 may include K vectors each having S dimensions. Thus, in some implementations, slot vectors 322-324 may be represented by an output matrix Y having K rows (each corresponding to a particular slot vector) and S columns.

In some implementations, query function 312 may include a linear transformation represented by a query weight matrix $W_{QUERY}$ having S rows and D columns. For example, query function 312 may include a multi-layer perceptron that includes one or more hidden layers and that utilizes one or more non-linear activation functions. Query function 312 (e.g., query weight matrix $W_{QUERY}$) may be learned during training of slot attention model 300. The output matrix Y may be transformed by query function 312 to generate a query input matrix $Y_{QUERY}$ (e.g., $Y_{QUERY}=YW_{QUERY}$), which may be provided as input to slot attention calculator 314. Query output matrix $Y_{QUERY}$ may include K rows and D columns. Thus, the dimension D may be shared by value function 308, key function 310, and query function 312.

Further, since the dimensions of the query weight matrix $W_{QUERY}$ do not depend on the number K of slot vectors 322-324, different values of K may be used during training and during testing/usage of slot attention model 300. For example, slot attention model 300 may be trained with K=7 slot vectors, but may be used with K=5 slot vectors or K=11 slot vectors. Thus, slot attention model 300 may be configured to generalize across different numbers of slot vectors 322-324 without explicit training, although training and using slot attention model 300 with the same number of slot vectors 322-324 may improve performance. However, since at least one dimension of the query weight matrix $W_{QUERY}$ does depend on the dimension S of slot vectors 322-324, the same value of S may be used during training and during testing/usage of slot attention model 300.

Slot attention calculator 314 may be configured to determine attention matrix 340 based on key input matrix $X_{KEY}$ generated by key function 310 and query input matrix $Y_{QUERY}$ generated by query function 312. Specifically, slot attention calculator 314 may be configured to calculate a dot product between key input matrix $X_{KEY}$ and a transpose of query output matrix $Y_{QUERY}$. In some implementations, slot attention calculator 314 may also divide the dot product by the square root of D (i.e., the number of columns of the $W_{VALUE}$, $W_{KEY}$, and/or $W_{QUERY}$ matrices). Thus, slot attention calculator 314 may implement the function $M=(1/\sqrt{D})X_{KEY}(Y_{QUERY})^T$, where M represents a non-normalized version of attention matrix 340 and may include N rows and K columns.

Slot attention calculator 314 may be configured to determine attention matrix 340 by normalizing the values of the matrix M with respect to the output axis (i.e., with respect to slot vectors 322-324). Thus, the values of the matrix M may be normalized along the rows thereof (i.e., along the dimension K corresponding to the number of slot vectors 322-324). Accordingly, each value in each respective row may be normalized with respect to the K values contained in the respective row.

Thus, slot attention calculator 314 may be configured to determine attention matrix 340 by normalizing each respective value of a plurality of values of each respective row of the matrix M with respect to the plurality of values of the respective row. Specifically, slot attention calculator 314 may determine attention matrix 340 according to $A_{i,j}=(e^{M_{i,j}})/(\Sigma_{l=1}^{K} e^{M_{i,l}})$, where $A_{i,j}$ indicates the value at a position corresponding to row i and column j of attention matrix 340, which may be alternatively referred to as attention matrix A. Normalizing the matrix M in this manner may cause slots to compete with one another for representing a particular entity. The function implemented by slot attention calculator 314 for computing $A_{i,j}$ may be referred to as a softmax function. Attention matrix A (i.e., attention matrix 340) may include N rows and K columns.

In other implementations, the matrix M may be transposed prior to normalization, and the values of the matrix $M^T$ may thus be normalized along the columns thereof (i.e., along the dimension K corresponding to the number of slot vectors 322-324). Accordingly, each value in each respective column of the matrix $M^T$ may be normalized with respect to the K values contained in the respective column. Slot attention calculator 314 may determine a transposed version of attention matrix 340 according to $A_{i,j}^T=(e^{M_{i,j}})/(\Sigma_{l=1}^{K} e^{M_{l,j}})$, where $A_{i,j}^T$ indicates the value at a position corresponding to row i and column j of transposed attention matrix 340, which may be alternatively referred to as transposed attention matrix $A^T$. Nevertheless, transposed attention matrix 340 may still be determined by normalizing the values of the matrix M with respect to the output axis (i.e., with respect to slot vectors 322-324).

Slot update calculator 316 may be configured to determine update matrix 342 based on value input matrix $X_{VALUE}$ generated by value function 308 and attention matrix 340. In one implementation, slot update calculator 316 may be configured to determine update matrix 342 by determining a dot product of a transpose of the attention matrix A and the value input matrix $X_{VALUE}$. Thus, slot update calculator 316 may implement the function $U_{WEIGHTED\ SUM}=A^T X_{VALUE}$, where the attention matrix A may be viewed as specifying the weights of a weighted sum calculation and the value input matrix $X_{VALUE}$ may be viewed as specifying the values of the weighted sum calculation. Update matrix 342 may thus be represented by $U_{WEIGHTED\ SUM}$, which may include K rows and D columns.

In another implementation, slot update calculator 316 may be configured to determine update matrix 342 by determining a dot product of a transpose of an attention weight matrix $W^{ATTENTION}$ and the value input matrix $X_{VALUE}$. Elements/entries of the attention weight matrix $W_{ATTENTION}$ may be defined as $W_{i,j}^{ATTENTION}=(A_{i,j})/(\Sigma_{l=1}^{N} A_{l,j})$, or, for the transpose thereof, as $(W_{i,j}^{ATTENTION})^T=(A_{i,j}^T)/(\Sigma_{l=1}^{N} A_{l,j}^T)$. Thus, slot update calculator 316 may implement the function $U_{WEIGHTED\ MEAN}=(W^{ATTENTION})^T X_{VALUE}$, where the matrix A may be viewed as specifying the weights of a weighted mean calculation and the value input matrix $X_{VALUE}$ may be viewed as specifying the values of the weighted mean calculation. Update matrix 342 may thus be represented by $U_{WEIGHTED\ MEAN}$, which may include K rows and D columns.

Update matrix 342 may be provided as input to neural network memory unit 320, which may be configured to update slot vectors 322-324 based on the previous values of slot vectors 322-324 (or predicted slot vectors generated based on slot vectors 322-324) and update matrix 342. Neural network memory unit 320 may include a gated recurrent unit (GRU) and/or a long-short term memory (LSTM) network, as well as other neural network or machine learning-based memory units configured to store and/or update slot vectors 322-324. For example, in addition to a GRU and/or an LSTM, neural network memory unit 320 may include one or more feed-forward neural network layers configured to further modify the values of slot vectors 322-324 after modification by the GRU and/or LSTM (and prior to being provided to task-specific machine learning model 330).

In some implementations, neural network memory unit 320 may be configured to update each of slot vectors 322-324 during each processing iteration, rather than updating only some of slot vectors 322-324 during each processing iteration. Training neural network memory unit 320 to update the values of slot vectors 322-324 based on the previous values thereof (or predicted slot vectors generated based on slot vectors 322-324) and based on update matrix 342, rather than using update matrix 342 as the updated values of slot vectors 322-324, may improve the accuracy and/or speed up convergence of slot vectors 322-324.

Slot attention model 300 may be configured to generate slot vectors 322-324 in an iterative manner. That is, slot vectors 322-324 may be updated one or more times before being passed on as input to task-specific machine learning model 330. For example, slot vectors 322-324 may be updated three times before being considered "ready" to be used by task-specific machine learning model 330. Specifically, the initial values of slot vectors 322-324 may be assigned thereto by slot vector initializer 318. When the initial values are random, they likely will not accurately represent the entities contained in input data 302. Thus, feature vectors 304-306 and the randomly-initialized slot vectors 322-324 may be processed by components of slot attention model 300 to refine the values of slot vectors 322-324, thereby generating updated slot vectors 322-324.

After this first iteration or pass through slot attention model 300, each of slot vectors 322-324 may begin to attend to and/or bind to, and thus represent, one or more corresponding entities contained in input data 302. Feature vectors 304-306 and the now-updated slot vectors 322-324 may again be processed by components of slot attention model 300 to further refine the values of slot vectors 322-324, thereby generating another update to slot vectors 322-324. After this second iteration or pass through slot attention model 300, each of slot vectors 322-324 may continue to attend to and/or bind to the one or more corresponding entities with increasing strength, thereby representing the one or more corresponding entities with increasing accuracy.

Further iterations may be performed, and each additional iteration may generate some improvement to the accuracy with which each of slot vectors 322-324 represents its corresponding one or more entities. After a predetermined number of iterations, slot vectors 322-324 may converge to an approximately stable set of values, resulting in no additional accuracy improvements. Thus, the number of iterations of slot attention model 300 may be selected based on (i) a desired level of representational accuracy for slot vectors 322-324 and/or (ii) desired processing time before slot vectors 322-324 are usable by task-specific machine learning model 330.

Task-specific machine learning model 330 may represent a plurality of different tasks, including both supervised and unsupervised learning tasks. In some implementations, task-specific machine learning model 330 may be co-trained with slot attention model 300. Thus, depending on the specific task associated with task-specific machine learning model 330, slot attention model 300 may be trained to generate slot vectors 322-324 that are adapted for and provide values useful in executing the specific task. Specifically, learned parameters associated with one or more of value function 308, key function 310, query function 312, and/or neural network memory unit 320 may vary as a result of training based on the specific task associated with task-specific machine learning model 330. In some implementations, slot attention model 300 may be trained using adversarial training and/or contrastive learning, among other training techniques.

Slot attention model 300 may take less time to train (e.g., 24 hours, compared to 7 days for an alternative approach executed on the same computing hardware) and consume fewer memory resources (e.g., allowing for a batch size of 64, compared to a batch size of 4 for the alternative approach executed on the same computing hardware) than alternative approaches for determining entity-centric representations. In some implementations, slot attention model 300 may also include one or more layer normalizations. For example, layer normalizations may be applied to feature vectors 304-306 prior to the transformation thereof by the key function 310, to slot vectors 322-324 prior to transformation thereof by query function 312, and/or to slot vectors 322-324 after being at least partially updated by neural network memory unit 320. Layer normalizations may improve the stability and speed up the convergence of slot attention model 300.

IV. Example Slot Vectors

Figure 4:
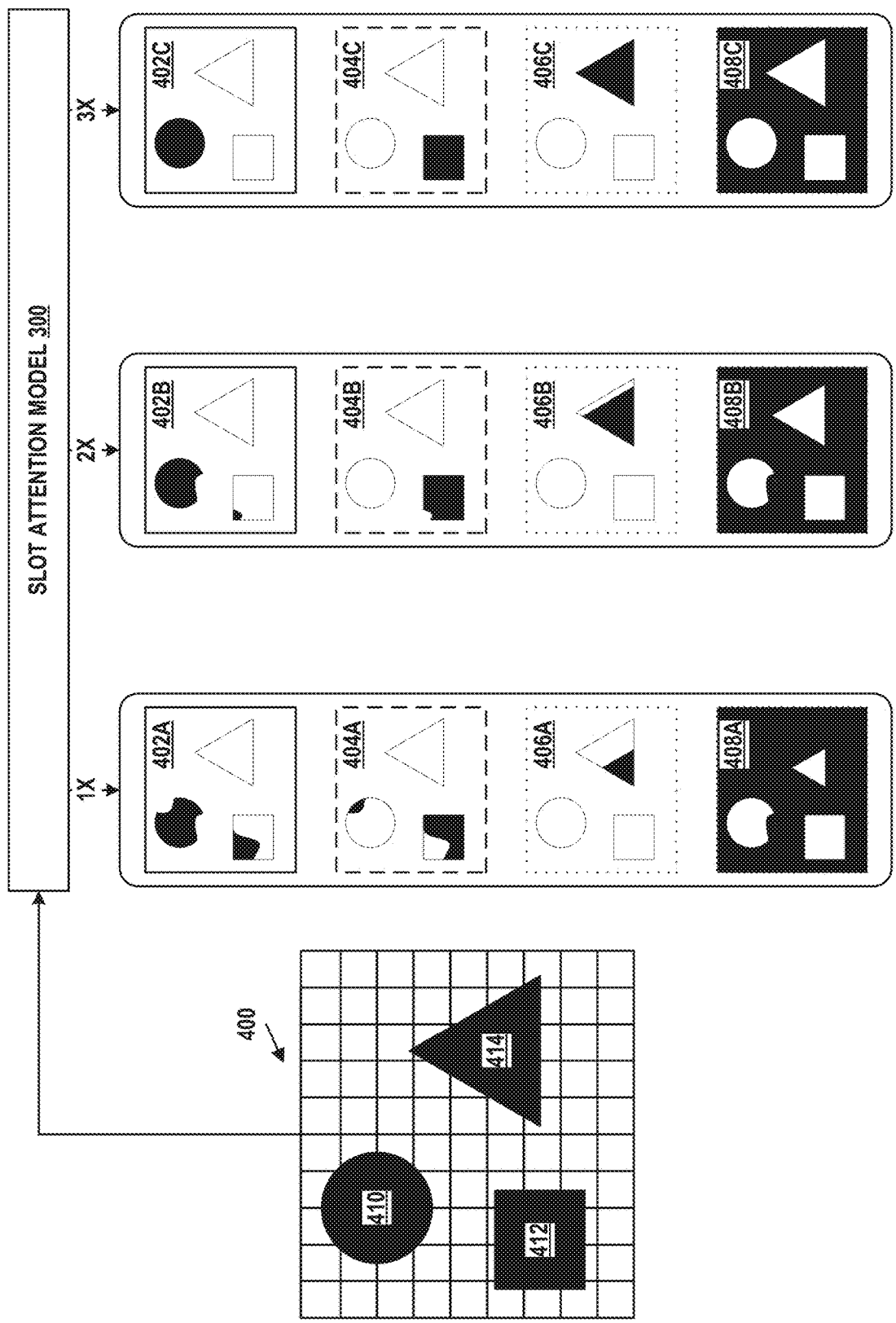
FIG. 4 illustrates slot vectors, in accordance with examples described herein.

FIG. 4 graphically illustrates an example of a plurality of slot vectors changing over the course of processing iterations by slot attention model 300 with respect to a particular perceptual representation. In this example, input data 302 is represented by image 400 that includes three entities: entity 410 (i.e., a circular object); entity 412 (i.e., a square object); and entity 414 (i.e., a triangular object). Image 400 may be processed by one or more machine learning models to generate feature vectors 304-306, each represented by a corresponding grid element of the grid overlaid on top of image 400. Thus, a leftmost grid element in the top row of the grid may represent feature vector 304, a rightmost grid element in the bottom row of the grid may represent feature vector 306, and grid elements therebetween may represent other feature vectors. Thus, each grid element may represent a plurality of vector values associated with the corresponding feature vector.

FIG. 4 illustrates the plurality of slot vectors as having four slot vectors. However, in general, the number of slot vectors may be modifiable. For example, the number of slot vectors may be selected to be at least equal to a number of entities expected to be present in input data 302 so that each entity may be represented by a corresponding slot vector. Thus, in the example illustrated in FIG. 4, the four slot vectors provided exceed the number of entities (i.e., the three entities 410, 412, and 414) contained in image 400. In cases where the number of entities exceeds the number of slot vectors, one or more slot vectors may represent two or more entities.

Slot attention model 300 may be configured to process the feature vectors associated with image 400 and the initial values of the four slot vectors (e.g., randomly initialized) to generate slot vectors with values 402A, 404A, 406A, and 408A. Slot vector values 402A, 404A, 406A, and 408A may represent the output of a first iteration (1×) of slot attention model 300. Slot attention model 300 may also be configured to process the feature vectors and slot vectors with values 402A, 404A, 406A, and 408A to generate slot vectors with values 402B, 404B, 406B, and 405B. Slot vector values 402B, 404B, 406B, and 408B may represent the output of a second iteration (2×) of slot attention model 300. Slot attention model 300 may be further configured to process the feature vectors and slot vectors with values 402B, 404B, 406B, and 408B to generate slot vectors with values 402C, 404C, 4060, and 408C. Slot vector values 402C, 404C, 406C, and 408C may represent the output of a third iteration (3×) of slot attention model 300. The visualizations of slot vector values 402A, 404A, 406A, 408A, 402B, 404B, 406B, 408B, 402C, 404C, 406C, 408C may represent visualizations of attention masks based on attention matrix 340 at each iteration and/or visualizations of reconstruction masks generated by task-specific machine learning model 330, among other possibilities.

The first slot vector (associated with values 402A, 402B, and 402C) may be configured to attend to and/or bind to entity 410, thereby representing attributes, properties, and/or characteristics of entity 410. Specifically, after the first iteration of slot attention model 300, the first slot vector may represent aspects of entity 410 and entity 412, as shown by the black-filled regions in the visualization of slot vector values 402A. After the second iteration of slot attention model 300, the first slot vector may represent a larger portion of entity 410 and a smaller portion of entity 412, as shown by the increased black-filled region of entity 410 and decreased black-filled region of entity 412 in the visualization of slot vector values 402B. After the third iteration of slot attention model 300, the first slot vector may represent entity 410 approximately exclusively, and might no longer represent entity 412, as shown by entity 410 being completely black-filled and entity 412 being illustrate completely white-filled in the visualization of slot vector values 402C. Thus, the first slot vector may converge and/or focus on representing entity 410 as slot attention model 300 updates and/or refines the values of the first slot vector. This attention and/or convergence of a slot vector to one or more entities is a result of the mathematical structure of components of slot attention model 300 and task-specific training of slot attention model 300.

The second slot vector (associated with values 404A, 4048, and 404C) may be configured to attend to and/or bind to entity 412, thereby representing attributes, properties, and/or characteristics of entity 412. Specifically, after the first iteration of slot attention model 300, the second slot vector may represent aspects of entity 412 and entity 410, as shown by the black-filled regions in the visualization of slot vector values 404A. After the second iteration of slot attention model 300, the second slot vector may represent a larger portion of entity 412 and might no longer represent entity 410, as shown by the increased black-filled region of entity 412 and entity 410 being illustrated completely white-filled in the visualization of slot vector values 404B. After the third iteration of slot attention model 300, the second slot vector may represent entity 412 approximately exclusively, and might continue to no longer represent entity 410, as shown by entity 412 being completely black-filled and entity 410 being completely white-filled in the visualization of slot vector values 404C. Thus, the second slot vector may converge and/or focus on representing entity 412 as slot attention model updates and/or refines the values of the second slot vector.

The third slot vector (associated with values 406A, 406B, and 406C) may be configured to attend to and/or bind to entity 414, thereby representing attributes, properties, and/or characteristics of entity 414. Specifically, after the first iteration of slot attention model 300, the third slot vector may represent aspects of entity 414, as shown by the black-filled regions in the visualization of slot vector values 406A. After the second iteration of slot attention model 300, the third slot vector may represent a larger portion of entity 414, as shown by the increased black-filled region of entity 414 in the visualization of slot vector values 404B. After the third iteration of slot attention model 300, the third slot vector may represent approximately the entirety of entity 414, as shown by entity 412 being completely black-filled in the visualization of slot vector values 406C. Thus, the third slot vector may converge and/or focus on representing entity 414 as slot attention model updates and/or refines the values of the third slot vector.

The fourth slot vector (associated with values 408A, 408B, and 408C) may be configured to attend to and/or bind to the background features of image 400, thereby representing attributes, properties, and/or characteristics of the background. Specifically, after the first iteration of slot attention model 300, the fourth slot vector may represent approximately the entirety of the background and respective portions of entities 410 and 414 that are not already represented by slot vector values 402A 404A, and/or 406A, as shown by the black-filled region in the visualization of slot vector values 408A. After the second iteration of slot attention model 300, the fourth slot vector may represent approximately the entirety of the background and smaller portions of entities 410 and 414 not already represented by slot vector values 402B 404B, and/or 406B, as shown by the black-filled region of the background and decreased black-filled region of entities 410 and 414 in the visualization of slot vector values 408B. After the third iteration of slot attention model 300, the fourth slot vector may approximately exclusively represent approximately the entirety of the background, as shown by the background being completely black-filled and entities 410, 412, and 414 being completely white-filled in the visualization of slot vector values 408C. Thus, the fourth slot vector may converge and/or focus on representing the background of image 400 as slot attention model updates and/or refines the values of the fourth slot vector.

In some implementations, rather than representing the background of image 400, the fourth slot vector may instead take on a predetermined value indicating that the fourth slot vector is not utilized to represent an entity. Thus, the background may be unrepresented. Alternatively or additionally, when additional slot vectors are provided (e.g., a fifth slot vector), the additional vectors may represent portions of the background or may be unutilized. Thus, in some cases, slot attention model 300 may distribute the representation of the background among multiple slot vectors. In some implementations, the slot vectors might treat the entities within the perceptual representation the same as the background thereof. Specifically, any one of the slot vectors may be used to represent the background and/or an entity (e.g., the background may be treated as another entity). Alternatively, in other implementations, one or more of the slot vectors may be reserved to represent the background.

The plurality of slot vectors may be invariant with respect to an order of the feature vectors and equivariant with respect to one another. That is, for a given initialization of the slot vectors, the order in which the feature vectors are provided at the input to slot attention model 300 does not affect the order and/or values of the slot vectors. However, different initializations of the slot vectors may affect the order of the slot vectors regardless of the order of the feature vectors. Further, for a given set of feature vectors, the set of values of the slot vectors may remain constant, but the order of the slot vectors may be different. Thus, different initializations of the slot vectors may affect the pairings between slot vectors and entities contained in the perceptual representation, but the entities may nevertheless be represented with approximately the same set of slot vector values.

V. Example Slot Vector Sequence System

Figure 5:
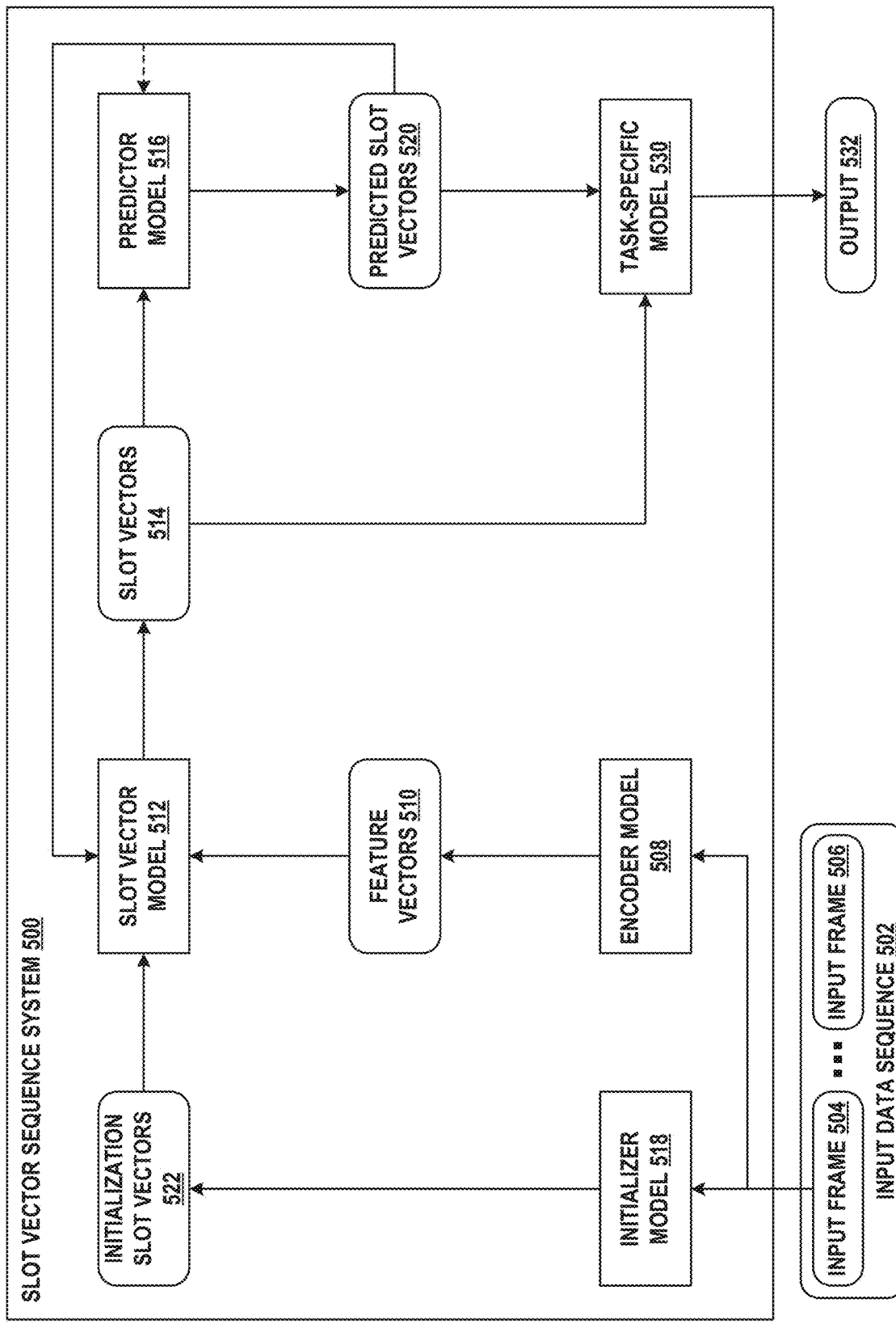
FIG. 5 illustrates a slot vector sequence model, in accordance with examples described herein.

FIG. 5 illustrates an example slot vector sequence system 500 that may be configured to generate, track, and/or update slot vectors for a sequence of input data frames. Specifically, slot vector sequence system 500 may include initializer model 518, encoder model 508, slot vector model 512, predictor model 516, and task-specific model 530. Slot vector sequence system 500 may be configured to generate output 532 based on input data sequence 502.

Input data sequence 502 may include input frame 504 through input frame 506 (i.e., input frames 504-506). Input data sequence 502 may represent, for example, a video (e.g., color, grayscale, depth. etc.), a sequence of point clouds, a sequence of RADAR images, and/or waveform or other a time series (represented in time domain and/or frequency domain), among other possibilities. Thus, in some cases, input data sequence 502 may be generated by one or more sensors and may represent a physical environment. Input data sequence 502 may be expressed as $x_t$, where $t \in \{1, \ldots, T\}$, $x_1$ represents input frame 504 and $x_T$ represents input frame 506.

Output 532 may include, for example, a reconstruction of input data sequence 502 or portions thereof, feature detections and/or classifications within input data sequence 502, control commands for a device (e.g., robotic device, vehicle, and/or computing device or aspects thereof), and/or other data that may be useful in performing one or more tasks based on input data sequence 502. Output 532 may depend on a task for which slot vector sequence system 500 is used and/or a type of input data sequence 502.

Encoder model 508 may be configured to generate feature vectors 510 based on an input frame of input data sequence 502. For example, encoder model 508 may be configured to generate, for each respective input frame of input frames 504-506, a corresponding instance of feature vectors 510. For example, feature vectors 510 may be expressed as $h_t = f(x_t) \in \mathbb{R}^{N \times D_{enc}}$, where f( ) may include trainable parameters of slot vector sequence system 500. In some cases, feature vectors 510 may collectively form and/or be arranged into a feature map. In some cases, feature vectors 510 may represent feature vectors 304-306 discussed in connection with FIG. 3. Thus, input matrix X may represent the feature vector $h_t$ for a particular time step (i.e., $h_t = X_t$), where $I = D_{enc}$.

Initializer model 518 may be configured to generate initialization slot vectors 522. In some implementations, initialization slot vectors 522 may be generated based on a selection of one or more entities in input frame 504 (i.e., the first input frame of input data sequence 502) to be represented by selected slot vectors (i.e., based on a desired entity to slot vector mapping). Thus, initialization slot vectors 522 may be configured to cause slot vector model 512 to represent a particular object using a selected one of slot vectors 514. Initializer model 518 may be configured to receive, for a particular slot vector of slot vectors 514, an indication of the corresponding entity (contained in input frame 504) to be represented by the particular slot vector. The indication of the corresponding entity may include, for example, a bounding box surrounding the corresponding entity, coordinates of a center of mass of and/or other point within the corresponding entity, and/or a segmentation mask associated with the corresponding entity.

Initializer model 518 may include, for each respective slot vector of the K slot vectors positions in slot vectors 514, a corresponding machine learning model (e.g., MLP) configured to transform the indication of the corresponding entity (possibly in combination with input frame 504) into an initial set of values for the respective slot vector.

In other implementations, initializer model 518 may be configured to generate initialization slot vector 522 randomly (e.g., by selecting values from a normal distribution). Thus, in some cases, initializer model 518 may be similar to and/or may include aspects of slot vector initializer shown in and discussed with respect to FIG. 3. In further implementations, initialization vectors 522 may be learned during training, and held fixed during inference. Thus, the same set of initialization slot vectors 522 may be used for a plurality of different input data sequences.

Slot vector model 512 may be configured to generate slot vectors 514 based on feature vectors 510 and other slot vectors. The other slot vectors may include, for example, initialization slot vectors 522 (when slot vector model is processing the first frame $x_1$ of input data sequence 502), a previously-determined instance of slot vectors 514, and/or predicted slot vectors 520. Slot vectors 514 may be expressed as $\hat{S}_t = [s_t^1, \ldots, s_t^K] \in \mathbb{R}^{K \times D}$.

In one example implementation, slot vector model 512 may include slot attention model 300 and/or components thereof. Thus, slot vectors 514 may represent slot vectors 322-324 discussed in connection with FIG. 3. Thus, output matrix Y may represent the set of slot vector values $S_t$ for a particular time step (i.e., $S_t = Y_t$), where S=D. The function implemented by slot vector model 512 may be alternatively expressed as $\hat{S}_t = \text{GRU}(U_t)$, where GRU( ) represents a gated recurrent unit (although other neural network memory units may be used instead, such as LSTMs), $U_t = (1/Z_t) \Sigma_{n=1}^{N} A_{t,n} \odot v(h_{t,n}) \in \mathbb{R}^{K \times D}$, $Z_t = \Sigma_{n=1}^{N} A_{t,n}$, $\odot$ denotes the Hadamard product, and $A_t = \text{softmax}_K((1/\sqrt{D})k(h_t)_q(S_t)^T) \in \mathbb{R}^{N \times K}$. In some implementations, the output of GRU( ) may be further processed by a MLP prior to being generated as an output of slot vector model 512. GRU( ), v( ), k( ), q( ), and/or MLP( ) may include trainable parameters of slot vector sequence system 500.

In other example implementations, slot vector model 512 may include a detection transformer model and/or a trackformer model. The detection transformer model may be implemented as detailed in a paper titled "End-to-End Object Detection with Transformers," authored by Nicolas Carion et al., and published as arXiv:2005.12872v3. The trackformer model may be implemented as detailed in a paper titled "TrackFormer: Multi-Object Tracking with Transformers," authored by Tim Meinhardt et al., and published as arXiv:2101.02702v2.

Predictor model 516 may be configured to generate predicted slot vectors 520 based on slot vectors 514 and/or a previously-determined instance of predicted slot vectors 520. Predicted slot vectors 520 may represent a transition of slot vectors 514 from a time associated with slot vectors 514 (e.g., t) to a subsequent time (e.g., t+1). Thus, whereas slot vectors 514 represent attributes of entities contained in a particular input frame of input data sequence 502 based on a processing of the particular input frame, predicted slot vectors 520 may represent an expected future state of the attributes of these entities in a future input frame of input data sequence 502. The expected future state of the attributes of these entities may be determined by predictor model 516 without processing the future input frame of input data sequence 502. Thus, predictor model 516 may be configured to determine an expected future behavior of one or more entities based on the attributes of the one or more entities, as represented by a most recent set of one or more slot vectors for the at least one entity. In some cases, slot vectors 514 may alternatively be referred to as observed slot vectors 514, since the values thereof are based on observed input frames of input data sequence 502.

Predicted slot vectors may be expressed as $S_t=[s_t^1, \ldots, s_t^K] \in \mathbb{R}^{K \times D}$. Predictor model 516 may be configured to implement the function $S_{t+1}=LN(MLP(\overline{S}_t)+\overline{S}_t)$, where $\overline{S}_t=LN(MultiHeadSelfAttn(\hat{S}_t)+\hat{S}_t)$, the function LN( ) represents a layer normalization, the function MLP( ) represents a multilayer perceptron, and the function MultiHeadSelfAttn( ) represents a multi-head dot product attention. For example, the function MultiHeadSelfAttn( ) may represent the multi-head self-attention block from the Transformer model, as detailed in a paper titled "Attention Is All You Need," authored by Ashish Vaswani et al., and published as arXiv:1706.03762v5. MultiHeadSelfAttn( ) and/or MLP( ) may include trainable parameters of slot vector sequence system 500.

Task-specific model 530 may be configured to generate output 532 based on slot vectors 514 and/or predicted slot vectors 520. Task-specific model 530 may include and/or be similar to task-specific machine learning model 330 shown in and discussed in connection with FIG. 3. Slot vector model 512, predictor model 516, and/or task-specific model 530 may be trained jointly, thereby resulting in slot vectors 514 and/or predicted slot vectors 520 that are useful for task-specific model 530 in performing its corresponding task. That is, co-training of slot vector model 512, predictor model 516, and/or task-specific model 530 allows task-specific model 530 to "understand" the values of slot vectors 514 and/or predicted slot vectors 520.

By relying on predicted slot vectors 520, task-specific model 530 may operate based on anticipated future states of the environment. For example, since predicted slot vectors 520 represent an expected future state of the entities represented by input data sequence 502, task-specific model 530 may be able to generate output 532 sooner than would be possible when operating based on slot vectors 514 alone. In the context of, for example, operation of an autonomous vehicle, such anticipation of future states may result in increased vehicle responsiveness and/or safety, among other benefits.

Additionally, slot vectors 514 and/or predicted slot vectors 520 may assist task-specific model 530 with handling and/or responding to occlusions of one or more entities. For example, if input frames 504-506 were processed individually, rather than as a sequence, the slot vectors of input frames where one or more entities are occluded might not represent the occluded entities. However, when input frames 504-506 are processed as a sequence, the temporary occlusion of the one or more entities may be represented explicitly by the values of slot vectors 514 and/or predicted slot vectors 520, rather than altogether omitting representing these entities.

In some implementations, task-specific model 530 may be a slot decoder model, which may be configured to generate, based on slot vectors 514 and/or predicted slot vectors 520, a reconstruction of one or more input frames of input data sequence 502. In cases where input data sequence 502 is a video, slot decoder model may additionally or alternatively predict an optical flow between two or more input frames of input data sequence 502. Input frame reconstruction and/or optical flow prediction may be performed, for example, as part of training of slot vector sequence system 500.

An element-wise (e.g., pixel-wise) reconstruction loss function may be used to quantify a quality with which slot vector sequence system 500 generates slot vectors 514 and/or predicted slot vectors 520, by measuring how well the original input and/or aspects thereof may be reconstructed based on these vectors. For example, a pixel-wise reconstruction loss function may be configured to compare pixel values of a reconstructed input frame to an original input frame. In another example, the pixel-wise reconstruction loss function may be configured to compare pixel values of a predicted optical flow between two input frames to a ground-truth optical flow measured between the two input frames. Trainable parameters of slot vector sequence system 500 may be adjusted until, for example, a loss value generated by the loss function is reduced below a threshold loss value.

In implementations where input data sequence 502 includes image data, task-specific model 530 may individually decode each of slot vectors 514 and/or predicted slot vectors 520 using a spatial broadcast decoder. Specifically, each slot may be broadcast onto a two-dimensional grid which may be augmented with position embeddings. Each grid may be decoded using a convolutional neural network (the parameters of which may be shared across each slot vector of slot vectors 514) to generate an output of size W×H×4, where W and H represent the width and height, respectively, of the reconstructed slot-specific image data and the additional 4 dimensions represent the red, green, and blue color channels and a non-normalized alpha mask thereof. The alpha masks may be normalized across the slot-specific images using a softmax function and may be used as mixture weights to recombine and/or mix the slot-specific images into a final reconstruction of the original image frame. In other examples, the slot decoder model may be and/or may include aspects of patch-based decoders.

Slot vector sequence system 500 may operate on input data sequence 502 in a sequential manner. For example, slot vector sequence system 500 may be configured to determine, using initializer model 518, initialization slot vectors 522 based on input frame $x_1$. Encoder model 508 may be configured to generate feature vectors $h_1$ based on input frame $x_1$. Slot vector model 512 may be configured to generate slot vectors $\hat{S}_1$ based on initialization slot vectors 522 and feature vectors $h_1$. Since input frame $x_1$ is the first input frame of input data sequence 502, prior instances of slot vectors 514 and/or predicted slot vectors 520 might not be available for input data sequence 502. Thus, for input frame $x_1$, slot vector model 512 may generate slot vectors 514 independently of predicted slot vectors 520 and/or prior instances of slot vectors 514, using initialization slot vectors 522 instead to "prime" slot vector model 512. Predictor model 516 may be configured to generate, based on slot vectors $\hat{S}_1$, predicted slot vectors $S_2$.

For input frame $x_2$, encoder model 508 may be configured to generate feature vectors $h_2$ based on input frame $x_2$. Slot vector model 512 may be configured to generate slot vectors $\hat{S}_2$ based on feature vectors $h_2$ and predicted slot vectors $S_2$. Slot vectors $\hat{S}_2$ may be generated independently of initialization slot vectors 522 at t=2, since initialization is no longer needed in view of the availability of predicted slot vectors $S_2$. Predictor model 516 may be configured to generate, based on slot vectors $\hat{S}_2$, predicted slot vectors $S_3$. This sequence may be repeated for all T input frames of input data sequence 502.

In some implementations, predictor model 516 may be autoregressive. For example, predictor model 516 may generate predicted slot vectors $S_t$ based on predicted slot vectors $S_{t-1}$, rather than based on slot vectors $\hat{S}_{t-1}$, corresponding to any input frames $x_{t-1}$ that have been skipped by slot vector model 512. For example, when slot vector model 512 is configured to generate slot vectors 514 for ever kth input frame (e.g., 1, k+1, 2 k+1, . . . ) of input data sequence 502, predictor model 516 may be configured to generate predicted slot vectors 520 for every frame of input data sequence, with every kth instance of predicted slot vectors 520 being based on slot vectors 514 and all other instances of predicted slot vectors 520 being based on an immediately preceding instance of predicted slot vectors 520. Thus, slot vector model 512 may be configured to omit (e.g., periodically or aperiodically) processing of some input frames of input data sequence 502, and predictor model 516 may be configured to operate autoregressive for any input frames omitted by slot vector model 512. Such an arrangement may be beneficial, for example, when a size and/or amount of computational resources involved in using slot vector model 512 exceeds a size and/or amount of computational resources involved in using predictor model 516.

Figure 6:
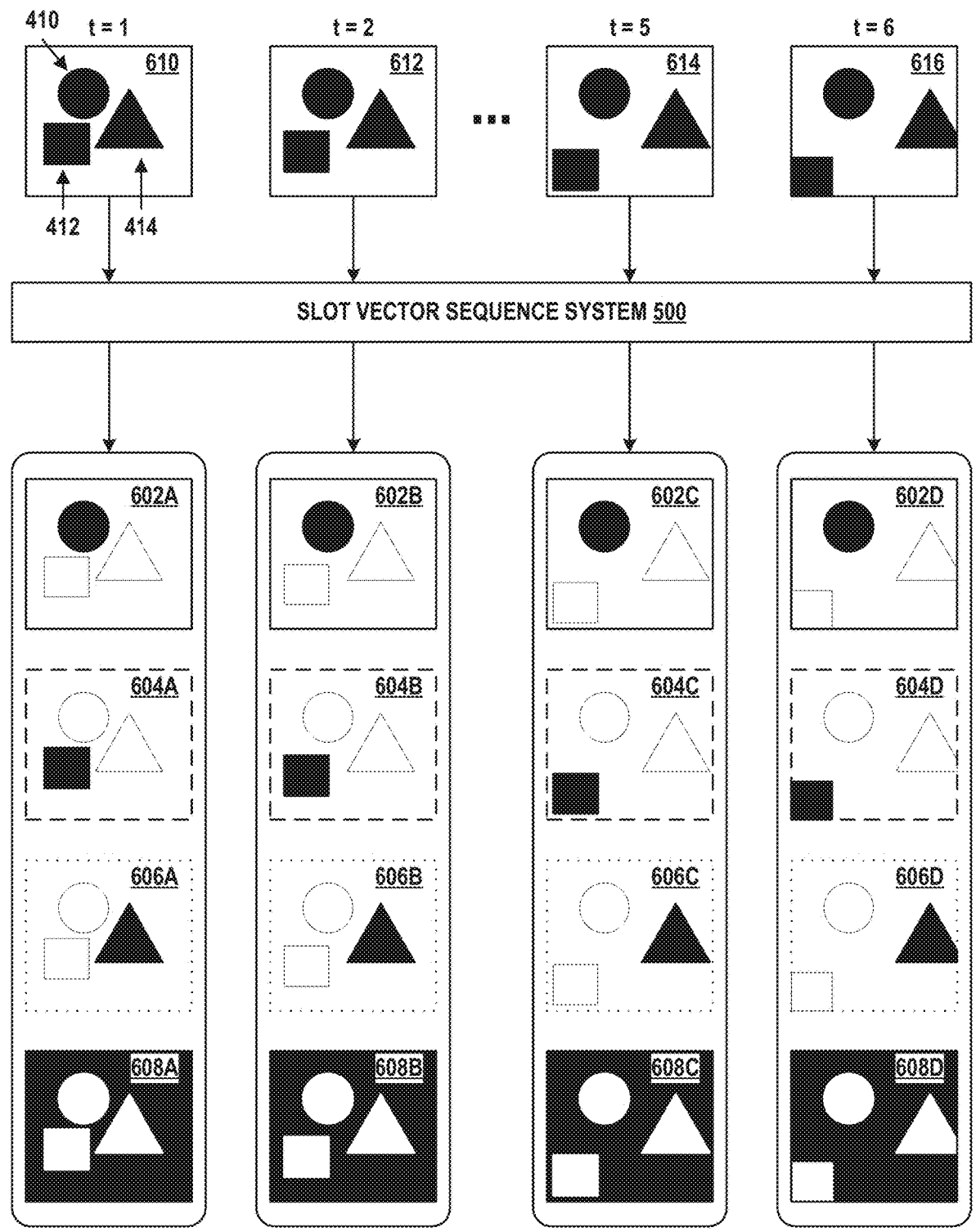
FIG. 6 illustrates slot vectors, in accordance with examples described herein.

FIG. 6 illustrates an example sequence of slot vectors corresponding to an example sequence of images. Specifically, images 610, 612 through 614, and 616 (i.e., images 610-616) provide one example of input frames 504-506, and may collectively form a video. Image 610 may correspond to time t=1, image 612 may correspond to time t=2, image 614 may correspond to time t=5, and image 616 may correspond to time t=6. Images 610-616 may depict motion of entities 410, 412, and 414 from time t=1 to time t=6. Specifically, entity 410 may remain in a fixed location, entity 412 may move diagonally towards the bottom left corner, and entity 414 may move horizontally to the right.

At each of times t=1 through t=6, slot vector sequence system 500 may be configured to generate a corresponding set of values for a plurality of slot vectors (e.g., generate a corresponding instance of slot vectors 514 for each of times t=1 through t=6. Slot vector sequence system 500 may be configured to generate (i), for time t=1, slot vectors with values 602A, 604A, 606A, and 608A, (ii), for time t=2, slot vectors with values 602B, 604B, 606B, and 608B, (iii), for time t=5, slot vectors with values 602C, 604C, 606C, and 608C, (iv), for time t=6, slot vectors with values 602D, 604D, 606D, and 608D, and (v), for other times that are not shown in FIG. 6, slot vectors with other corresponding values (not shown).

The first slot vector with values 602A, 602B, 602C, and 602D may represent entity 410 across time, the second slot vector with values 604A, 604B, 604C, and 604D may represent entity 412 across time, the third slot vector with values 606A, 606B, 606C, and 606D may represent entity 414 across time, and the fourth slot vector with values 608A, 608B, 608C, and 608D may represent the background across time. The binding, attending, and/or mapping of the different slot vectors to the corresponding entities may be a result of a deterministic selection or a random initialization by initializer model 518, as discussed in connection with FIG. 5. For example, the first slot vector may be caused to represent entity 410 over time by initializing the first slot vector based on a bounding box, segmentation mask, center point, and/or other indication of entity 410.

Unlike in FIG. 4, where each set of values shown for the slot vectors represents a result of processing a single input frame multiple times to cause the slot vectors to converge to corresponding entities, FIG. 6 illustrates sets of slot vector values resulting from processing a sequence of different input frames. At least some of the slot vectors shown in FIG. 6 may remain bound and/or converged to their corresponding entities over time due to (i) predictor model 516 being configured to model and/or predict temporal changes of the corresponding entities and/or (ii) the change between consecutive input frames of the input sequence being relatively small such that the values of each slot vector change gradually, rather than abruptly.

The predicted slot vectors corresponding to input frames 610-616 may include the same number of vectors (i.e., 4 vectors) as the slot vectors shown in FIG. 6. In some cases, the values of the predicted slot vectors may, when visualized in the manner of FIG. 6, be expected look approximately like an interpolation between the consecutive values of corresponding slot vectors. For example, the predicted slot vectors corresponding to time t=2 may look like interpolations between values 602A and 602B, 604A and 604B, 606A and 606B, and 608A and 608B. Thus, one iteration of predictor model 516 may be viewed as providing at least part of the benefit of one iteration of slot vector model 512, thereby allowing the resultant slot vectors to remain bound and/or converged to the corresponding entities after as little as one iteration of slot vector model 512.

In cases where predictor model 516 is very accurate at predicting the future attributes of the corresponding entities, the predicted slot vectors corresponding to time t=2 may look approximately like values 602B, 604B, 606B, and 608B. That is, for a given time step, a predicted slot vector value that is accurately determined may be approximately equal to (e.g., have no more than a threshold difference from) a corresponding slot vector value determined for the given time step based on an input frame for the given time step. In cases where predictor model 516 is relatively inaccurate at predicting the future attributes of the corresponding entities, the predicted slot vectors corresponding to time t=2 may look approximately like values 602A, 604A, 606A, and 608A, or values that are dissimilar from any of values 602A, 602B, 604A, 604B, 606A, 606B, 608A, and 608B.

When predictor model 516 is used autoregressively to, for example, generate predicted slot vectors for time t=6 based on (i) slot vector values 602A, 604A, 604A, and 606A generated by slot vector model 512 for time t=1 and (ii) predicted slot vector values generated by predictor model 516 for times t=2 through t=5 (but without slot vector model 512 generating slot vector values for times t=2 through t=5), the predicted slot vector values for time t=6 may differ from slot vector values 602D, 604D, 606D, and 608D more than these values would otherwise differ if predictor model 516 was not used autoregressively (i.e., if slot vector model 512 generated slot vector values for times t=2 through t=5 to be used in determining the predicted slot vector values for time t=6). That is, autoregressive operation of predictor model 516 may sacrifice some accuracy to reduce the usage of computational resources by slot vector sequence system 500.

VI. Additional Example Operations

Figure 7:
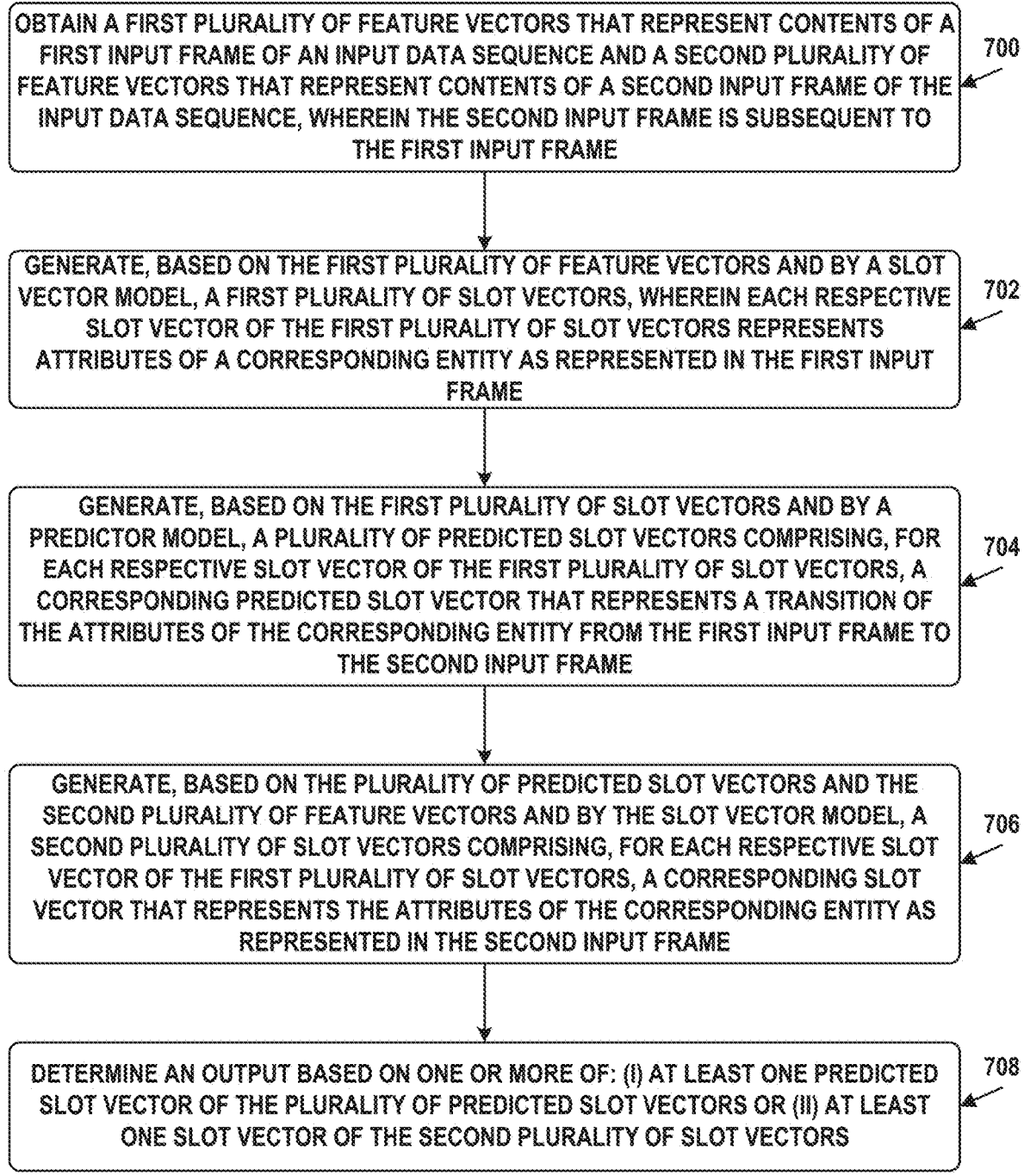
FIG. 7 illustrates a flow chart, in accordance with examples described herein.

FIG. 7 illustrates a flow chart of operations related to generating, tracking, and/or updating slot vectors based on input frames of an input data sequence. The input data sequence may include an ordered sequence of a plurality of input frames, each of which may be time-stamped according to its position within the sequence. The operations may be carried out by computing system 100, computing device 200, slot attention model 300, and/or slot vector sequence system 500, among other possibilities. The embodiments of FIG. 7 may be simplified by the removal of any one or more of the features shown therein. Further, these embodiments may be combined with features, aspects, and/or implementations of any of the previous figures or otherwise described herein.

Block 700 may involve obtaining a first plurality of feature vectors that represent contents of a first input frame of an input data sequence and a second plurality of feature vectors that represent contents of a second input frame of the input data sequence. The second input frame may be subsequent to the first input frame. For example, the second input frame may be consecutive with the first input frame, or may be separated therefrom by one or more other input frames.

Block 702 may involve generating, based on the first plurality of feature vectors and by a slot vector model, a first plurality of slot vectors. Each respective slot vector of the first plurality of slot vectors may represent attributes of a corresponding entity as represented in the first input frame. The corresponding entity may be represented in different ways in different input frames, thus resulting in the respective slot vector having different values over time.

Block 704 may involve generating, based on the first plurality of slot vectors and by a predictor model, a plurality of predicted slot vectors that includes, for each respective slot vector of the first plurality of slot vectors, a corresponding predicted slot vector. The corresponding predicted slot vector may represent a transition of the attributes of the corresponding entity from the first input frame to the second input frame.

Block 706 may involve generating, based on the plurality of predicted slot vectors and the second plurality of feature vectors and by the slot vector model, a second plurality of slot vectors that includes, for each respective slot vector of the first plurality of slot vectors, a corresponding slot vector. The corresponding slot vector may represent the attributes of the corresponding entity as represented in the second input frame.

Block 708 may involve determining an output based on one or more of: (i) at least one predicted slot vector of the plurality of predicted slot vectors or (ii) at least one slot vector of the second plurality of slot vectors.

In some embodiments, generating the plurality of predicted slot vectors may include determining a plurality of self-attention scores based on the first plurality of slot vectors, and generating the plurality of predicted slot vectors based on the plurality of self-attention scores.

In some embodiments, determining the plurality of self-attention scores may include determining the plurality of self-attention scores using two or more self-attention heads, where each respective self-attention head of the two or more self-attention heads includes a corresponding set of model parameters according to which the first plurality of slot vectors are processed. For example, the plurality of self-attention scores may be determined using a multi-head self-attention block from the Transformer model, as detailed in a paper titled "Attention Is All You Need," authored by Ashish Vaswani et al., and published as arXiv: 1706.03762v5.

In some embodiments, generating the plurality of predicted slot vectors based on the plurality of self-attention scores may include generating, by an artificial neural network, an intermediate output based on a first sum of (i) the plurality of self-attention scores and (ii) the first plurality of slot vectors, and determining the plurality of predicted slot vectors based on a second sum of the intermediate output and the first sum.

In some embodiments, generating the plurality of predicted slot vectors may include processing the first plurality of slot vectors by a graph neural network. Each respective slot vector of the first plurality of slot vectors may correspond to a node modeled by the graph neural network, and relationships among the first plurality of slot vectors may correspond to edges modeled by the graph neural network. The plurality of predicted slot vectors may be generated based on an output of the graph neural network.

In some embodiments, the graph neural network may be an interaction neural network configured to compare a plurality of different ordered pairs of slot vectors of the first plurality of slot vectors. For example, the graph neural network may be the interaction neural network as detailed in a paper titled "interaction Networks for Learning about Objects, Relations and Physics," authored by Peter W. Battaglia et al., and published as arXiv:1612.00222v1.

In some embodiments, a plurality of initialization slot vectors may be generated. The plurality of initialization slot vectors may include, for each respective slot vector of the first plurality of slot vectors, a corresponding initialization slot vector. The first plurality of slot vectors may be generated further based on the plurality of initialization slot vectors.

In some embodiments, generating the plurality of initialization slot vectors may include obtaining, for particular slot vector of the first plurality of slot vectors, an indication of the corresponding entity to be represented by the particular slot vector, and generating, based on the indication of the corresponding entity, and for the particular slot vector, the corresponding initialization slot vector configured to bind the particular slot vector to the corresponding entity.

In some embodiments, the indication of the corresponding entity to be represented by the particular slot vector may include one or more of: (i) a bounding box associated with the corresponding entity, (ii) coordinates of a center of mass of the corresponding entity, or (iii) a segmentation mask associated with the corresponding entity.

In some embodiments, the plurality of initialization slot vectors may be generated by a machine learning model configured to process the indication of the corresponding entity and generate the corresponding initialization slot vector. For example, the machine learning model may include one or more of: (i) a multi-layer perceptron configured to process the indication of the corresponding entity and generate the corresponding initialization slot vector or (ii) a convolutional neural network configured to process the indication of the corresponding entity and generate the corresponding; initialization slot vector.

In some embodiments, generating the plurality of initialization slot vectors may include generating, for at least one slot vector of the first plurality of slot vectors, the corresponding initialization slot vector based on values selected from a normal distribution.

In some embodiments, generating the plurality of initialization slot vectors may include learning the plurality of initialization slot vectors during training.

In some embodiments, determining the output may include processing, by a machine learning model, the one or more of: (i) the at least one predicted slot vector of the plurality of predicted slot vectors or (ii) the at least one slot vector of the second plurality of slot vectors to generate a task-specific output for a particular task. The machine learning model may have been trained to generate task-specific outputs based on one or more of slot vectors or predicted slot vectors. Determining the output may also include providing instructions to perform the particular task in accordance with the task-specific output generated by the machine learning model.

In some embodiments, the input data sequence may include a video, the first input frame may include a first image, the second input frame may include a second image, and the corresponding entity may include an object represented in the video.

In some embodiments, the input data sequence may include a series of successive point clouds of an environment, the first input frame may include a first point cloud, the second input frame may include a second point cloud, and the corresponding entity may include an object represented in the series of successive point clouds.

In some embodiments, the input data sequence may include a waveform, the first input frame may include a first spectrogram, the second input frame may include a second spectrogram, and the corresponding entity may include a waveform pattern represented in the waveform.

In some embodiments, the predicted slot vectors may be permutation symmetric with respect to one another such that, for multiple different initializations of the first plurality of slot vectors with respect to a given input data sequence, a set of values of the plurality of predicted slot vectors may be approximately constant and an order of the plurality of predicted slot vectors may be variable. The predicted slot vectors may be permutation symmetric with respect to the first plurality of feature vectors such that, for multiple different permutations of the first plurality of feature vector, the set of values of the plurality of predicted slot vectors may be approximately constant. Accordingly, the predictor model configured to generate the predicted slot vectors may be permutation equivariant.

In some embodiments, the slot vector model may include at least one of: (i) a slot attention model, (ii) a detection transformer model, or (iii) a trackformer model.

In some embodiments, one or more of (i) the slot vector model or (ii) the predictor model have been trained by a training process that includes obtaining a first plurality of training feature vectors that represent contents of a first training input frame of a training input data sequence, a second plurality of training feature vectors that represent contents of a second training input frame of the training input data sequence, and a ground-truth output corresponding to the second training input frame. The second training input frame may be subsequent to the first training input frame. The training process may also include generating, based on the first plurality of training feature vectors and by the slot vector model, a first plurality of training slot vectors. Each respective training slot vector of the first plurality of training slot vectors may represent attributes of a corresponding training entity as represented in the first training input frame. The training process may additionally include generating, based on the first plurality of training slot vectors and by the predictor model, a plurality of predicted training slot vectors that includes, for each respective training slot vector of the first plurality of training slot vectors, a corresponding predicted training slot vector. The corresponding predicted slot vector may represent a transition of the attributes of the corresponding training entity from the first training input frame to the second training input frame. The training process may further include generating, based on the plurality of predicted training slot vectors and the second plurality of training feature vectors and by the slot vector model, a second plurality of training slot vectors that includes, for each respective training slot vector of the first plurality of training slot vectors, a corresponding training slot vector. The corresponding training slot vector may represent the attributes of the corresponding training entity as represented in the second training input frame. The training process may yet further include determining a training output based on decoding at least one of: (i) the plurality of predicted training slot vectors or (ii) the second plurality of training slot vectors, determining a loss value based on a comparison of the ground-truth output and the training output by way of a loss function, and, based on the loss value, adjusting one or more parameters of the one or more of (i) the slot vector model or (ii) the predictor model.

In some embodiments, determining the training output may include generating a reconstruction of the second training input frame based on the one or more of: (i) the plurality of predicted training slot vectors or (ii) the second plurality of training slot vectors.

In some embodiments, determining the training output may include determining a flow vector field representing changes between the first training input frame and the second training input frame based on the one or more of: (i) the plurality of predicted training slot vectors or (ii) the second plurality of training slot vectors.

In some embodiments, the first input frame and the second input frame may be non-consecutive, and thus separated by one or more intermediate input frames. Accordingly, the plurality of predicted slot vectors may include a plurality of sequential subsets of predicted slot vectors, with some of the sequential subsets being generated for the one or more intermediate input frames. The intermediate input frames might not be processed by the slot vector model, thus allowing the slot vector model to operate at varying frame rates that differ from a frame rate at which the predictor model operates.

For example, when the second input frame is separated from the first input frame by one intermediate frame, a first plurality of predicted slot vectors may be generated for the intermediate frame based on the first plurality of slot vectors, and a second plurality of predicted slot vectors may be generated for the second input frame based on the first plurality of predicted slot vectors. The slot vector model might not process the first plurality of predicted slot vectors, but may process the second plurality of predicted slot vectors. Thus, when the first input frame and the second input frame are non-consecutive, the predictor model may be configured to generate predicted slot vectors based on other, previously-generated predicted slot vectors. Accordingly, the predictor model may be considered to be autoregressive. Each respective predicted slot vector of the second plurality of predicted slot vectors may be considered to represent a transition of the attributes of a corresponding entity from the first input frame to the second input frame because, since the second plurality of predicted slot vectors is based on the first plurality of predicted slot vectors, the second plurality of predicted slot vectors reflects the transition of the attributes from the first input frame to the intermediate input frame.

Figure 8:
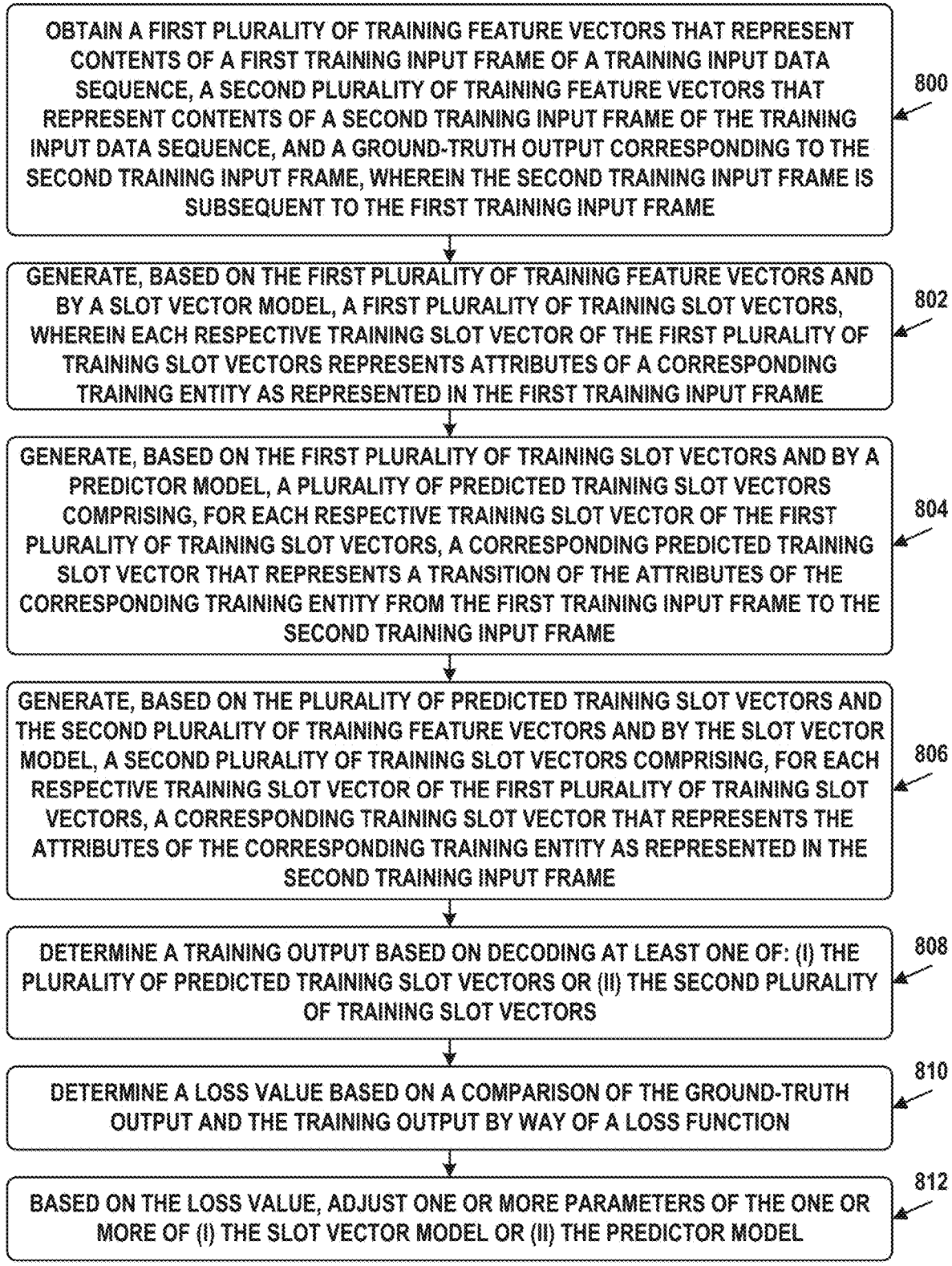
FIG. 8 illustrates a flow chart, in accordance with examples described herein.

FIG. 8 illustrates a flow chart of operations related to training of a machine learning model configured to generate, track, and/or update slot vectors based on input frames of an input data sequence. The operations may be carried out by computing system 100, computing device 200, and/or slot attention model 300, among other possibilities. The embodiments of FIG. 8 may be simplified by the removal of any one or more of the features shown therein. Further, these embodiments may be combined with features, aspects, and/or implementations of any of the previous figures or otherwise described herein.

Block 800 may involve obtaining a first plurality of training feature vectors that represent contents of a first, training input frame of a training input data sequence, a second plurality of training feature vectors that represent contents of a second training input frame of the training input data sequence, and a ground-truth output corresponding to the second training input frame. The second training input frame may be subsequent to the first training input frame.

Block 802 may involve generating, based on the first plurality of training feature vectors and by a slot vector model, a first plurality of training slot vectors. Each respective training slot vector of the first plurality of training slot vectors may represent attributes of a corresponding training entity as represented in the first training input frame.

Block 804 may involve generating, based on the first plurality of training slot vectors and by a predictor model, a plurality of predicted training slot vectors that includes, for each respective training slot vector of the first plurality of training slot vectors, a corresponding predicted training slot vector. The corresponding predicted training slot vector may represent a transition of the attributes of the corresponding training entity from the first training input frame to the second training input frame.

Block 806 may involve generating, based on the plurality of predicted training slot vectors and the second plurality of training feature vectors and by the slot vector model, a second plurality of training slot vectors that includes, for each respective training slot vector of the first plurality of training slot vectors, a corresponding training slot vector. The corresponding training slot vector may represent the attributes of the corresponding training entity as represented in the second training input frame.

Block 808 may involve determining a training output based on decoding at least one of: (i) the plurality of predicted training slot vectors or (ii) the second plurality of training slot vectors.

Block 810 may involve determining a loss value based on a comparison of the ground-truth output and the training output by way of a loss function.

Block 812 may involve, based on the loss value, adjusting one or more parameters of one or more of (i) a slot vector model configured to generate slot vectors or (ii) a predictor model configured to generate predicted slot vectors.

VII. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical operations or actions in the method or technique. The program code and/or related data may be stored on any type of computer readable medium such as a storage device including random access memory (RAM), a disk drive, a solid state drive, or another storage medium.

The computer readable medium may also include non-transitory computer readable media such as computer readable media that store data for short periods of time like register memory, processor cache, and RAM. The computer readable media may also include non-transitory computer readable media that store program code and/or data for longer periods of time. Thus, the computer readable media may include secondary or persistent long term storage, like read only memory (ROM), optical or magnetic disks, solid state drives, compact-disc read only memory (CD-ROM), for example. The computer readable media may also be any other volatile or non-volatile storage systems. A computer readable medium may be considered a computer readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A computer-implemented method comprising:
   obtaining, by a machine learning model, a first plurality of feature vectors that represent contents of a first input frame of an input data sequence and a second plurality of feature vectors that represent contents of a second input frame of the input data sequence, wherein the second input frame is subsequent to the first input frame;

generating, based on the first plurality of feature vectors and by a slot vector model of the machine learning model, a first plurality of slot vectors, wherein each respective slot vector of the first plurality of slot vectors represents attributes of a corresponding entity as represented in the first input frame;

generating, based on the first plurality of slot vectors and by a predictor model of the machine learning model, a plurality of predicted slot vectors comprising, for each respective slot vector of the first plurality of slot vectors, a corresponding predicted slot vector that represents a transition of the attributes of the corresponding entity from the first input frame to the second input frame, wherein generating the plurality of predicted slot vectors comprises:
　determining a plurality of self-attention scores based on the first plurality of slot vectors;
　generating an intermediate output based on a first sum of (i) the plurality of self-attention scores and (ii) the first plurality of slot vectors; and
　determining the plurality of predicted slot vectors based on a second sum of the intermediate output and the first sum;

generating, based on the plurality of predicted slot vectors and the second plurality of feature vectors and by the slot vector model, a second plurality of slot vectors comprising, for each respective slot vector of the first plurality of slot vectors, a corresponding slot vector that represents the attributes of the corresponding entity as represented in the second input frame;

determining, by the machine learning model, a task-specific output based on one or more of: (i) at least one predicted slot vector of the plurality of predicted slot vectors or (ii) at least one slot vector of the second plurality of slot vectors; and causing a device to perform a task based on the task-specific output.

2. The computer-implemented method of claim 1, wherein determining the plurality of self-attention scores comprises:
　determining the plurality of self-attention scores using two or more self-attention heads, wherein each respective self-attention head of the two or more self-attention heads comprises a corresponding set of model parameters according to which the first plurality of slot vectors are processed.

3. The computer-implemented method of claim 1, wherein generating the plurality of predicted slot vectors comprises:
　processing the first plurality of slot vectors by a graph neural network, wherein each respective slot vector of the first plurality of slot vectors corresponds to a node modeled by the graph neural network, and wherein relationships among the first plurality of slot vectors correspond to edges modeled by the graph neural network; and
　generating the plurality of predicted slot vectors based on an output of the graph neural network.

4. The computer-implemented method of claim 3, wherein the graph neural network is an interaction neural network configured to compare a plurality of different ordered pairs of slot vectors of the first plurality of slot vectors.

5. The computer-implemented method of claim 1, further comprising:
　generating a plurality of initialization slot vectors comprising, for each respective slot vector of the first plurality of slot vectors, a corresponding initialization slot vector, wherein the first plurality of slot vectors is generated further based on the plurality of initialization slot vectors.

6. The computer-implemented method of claim 5, wherein generating the plurality of initialization slot vectors comprises:
　obtaining, for particular slot vector of the first plurality of slot vectors, an indication of the corresponding entity to be represented by the particular slot vector; and
　generating, based on the indication of the corresponding entity, and for the particular slot vector, the corresponding initialization slot vector configured to bind the particular slot vector to the corresponding entity.

7. The computer-implemented method of claim 6, wherein the indication of the corresponding entity to be represented by the particular slot vector comprises one or more of: (i) a bounding box associated with the corresponding entity, (ii) coordinates of a center of mass of the corresponding entity, or (iii) a segmentation mask associated with the corresponding entity, and wherein the plurality of initialization slot vectors are generated by an initializer model configured to process the indication of the corresponding entity and generate the corresponding initialization slot vector.

8. The computer-implemented method of claim 5, wherein generating the plurality of initialization slot vectors comprises:
　generating, for at least one slot vector of the first plurality of slot vectors, the corresponding initialization slot vector based on values selected from a normal distribution.

9. The computer-implemented method of claim 1, wherein determining the task-specific output comprises:
　processing, by the machine learning model, the one or more of: (i) the at least one predicted slot vector of the plurality of predicted slot vectors or (ii) the at least one slot vector of the second plurality of slot vectors to generate a task-specific output for a particular task, wherein the machine learning model has been trained to generate task-specific outputs based on one or more of slot vectors or predicted slot vectors.

10. The computer-implemented method of claim 1, wherein:
　the input data sequence comprises a video, the first input frame comprises a first image, the second input frame comprises a second image, and the corresponding entity comprises an object represented in the video;
　the input data sequence comprises a series of successive point clouds of an environment, the first input frame comprises a first point cloud, the second input frame comprises a second point cloud, and the corresponding entity comprises an object represented in the series of successive point clouds; or
　the input data sequence comprises a waveform, the first input frame comprises a first spectrogram, the second input frame comprises a second spectrogram, and the corresponding entity comprises a waveform pattern represented in the waveform.

11. The computer-implemented method of claim 1, wherein the predicted slot vectors are permutation symmetric with respect to one another such that, for multiple different initializations of the first plurality of slot vectors with respect to a given input data sequence, a set of values of the plurality of predicted slot vectors is approximately constant and an order of the plurality of predicted slot vectors is variable, and wherein the predicted slot vectors are permutation symmetric with respect to the first plurality of feature vectors such that, for multiple different permutations of the first plurality of feature vector, the set of values of the plurality of predicted slot vectors is approximately constant.

12. The computer-implemented method of claim 1, wherein the slot vector model comprises at least one of: (i) a slot attention model, (ii) a detection transformer model, or (iii) a trackformer model.

13. The computer-implemented method of claim 1, wherein one or more of (i) the slot vector model or (ii) the predictor model have been trained by a training process comprising:
obtaining a first plurality of training feature vectors that represent contents of a first training input frame of a training input data sequence, a second plurality of training feature vectors that represent contents of a second training input frame of the training input data sequence, and a ground-truth output corresponding to the second training input frame, wherein the second training input frame is subsequent to the first training input frame;
generating, based on the first plurality of training feature vectors, a first plurality of training slot vectors, wherein each respective training slot vector of the first plurality of training slot vectors represents attributes of a corresponding training entity as represented in the first training input frame;
generating, based on the first plurality of training slot vectors, a plurality of predicted training slot vectors comprising, for each respective training slot vector of the first plurality of training slot vectors, a corresponding predicted training slot vector that represents a transition of the attributes of the corresponding training entity from the first training input frame to the second training input frame;
generating, based on the plurality of predicted training slot vectors and the second plurality of training feature vectors, a second plurality of training slot vectors comprising, for each respective training slot vector of the first plurality of training slot vectors, a corresponding training slot vector that represents the attributes of the corresponding training entity as represented in the second training input frame;
determining a training output based on decoding at least one of: (i) the plurality of predicted training slot vectors or (ii) the second plurality of training slot vectors;
determining a loss value based on a comparison of the ground-truth output and the training output by way of a loss function; and
based on the loss value, adjusting one or more parameters of the one or more of (i) the slot vector model or (ii) the predictor model.

14. The computer-implemented method of claim 13, wherein determining the training output comprises:
generating a reconstruction of the second training input frame based on the one or more of: (i) the plurality of predicted training slot vectors or (ii) the second plurality of training slot vectors.

15. The computer-implemented method of claim 13, wherein determining the training output comprises:
determining a flow vector field representing changes between the first training input frame and the second training input frame based on the one or more of: (i) the plurality of predicted training slot vectors or (ii) the second plurality of training slot vectors.

16. The computer-implemented method of claim 1, wherein the second input frame is separated from the first input frame by an intermediate input frame, and wherein generating the plurality of predicted slot vectors comprises:
generating, based on the first plurality of slot vectors and by the predictor model, a plurality of intermediate predicted slot vectors comprising, for each respective slot vector of the first plurality of slot vectors, a corresponding intermediate predicted slot vector that represents a transition of the attributes of the corresponding entity from the first input frame to the intermediate input frame; and
generating, based on the plurality of intermediate predicted slot vectors and by the predictor model, the plurality of predicted slot vectors comprising, for each respective slot vector of the first plurality of slot vectors, the corresponding predicted slot vector that represents a transition of the attributes of the corresponding entity from the intermediate input frame to the second input frame.

17. A system comprising:
a processor; and
a non-transitory computer-readable medium having stored thereon instructions that, when executed by the processor, cause the processor to perform operations comprising:
obtaining, by a machine learning model, a first plurality of feature vectors that represent contents of a first input frame of an input data sequence and a second plurality of feature vectors that represent contents of a second input frame of the input data sequence, wherein the second input frame is subsequent to the first input frame;
generating, based on the first plurality of feature vectors and by a slot vector model of the machine learning model, a first plurality of slot vectors, wherein each respective slot vector of the first plurality of slot vectors represents attributes of a corresponding entity as represented in the first input frame;
generating, based on the first plurality of slot vectors and by a predictor model of the machine learning model, a plurality of predicted slot vectors comprising, for each respective slot vector of the first plurality of slot vectors, a corresponding predicted slot vector that represents a transition of the attributes of the corresponding entity from the first input frame to the second input frame, wherein generating the plurality of predicted slot vectors comprises:
determining a plurality of self-attention scores based on the first plurality of slot vectors;
generating an intermediate output based on a first sum of (i) the plurality of self-attention scores and (ii) the first plurality of slot vectors; and
determining the plurality of predicted slot vectors based on a second sum of the intermediate output and the first sum;
generating, based on the plurality of predicted slot vectors and the second plurality of feature vectors and by the slot vector model, a second plurality of slot vectors comprising, for each respective slot vector of the first plurality of slot vectors, a corresponding slot vector that represents the attributes of the corresponding entity as represented in the second input frame;

determining, by the machine learning model, a task-specific output based on one or more of: (i) at least one predicted slot vector of the plurality of predicted slot vectors or (ii) at least one slot vector of the second plurality of slot vectors; and causing a device to perform a task based on the task-specific output.

18. A non-transitory computer-readable medium having stored thereon instructions that, when executed by a computing device, cause the computing device to perform operations comprising:

obtaining, by a machine learning model, a first plurality of feature vectors that represent contents of a first input frame of an input data sequence and a second plurality of feature vectors that represent contents of a second input frame of the input data sequence, wherein the second input frame is subsequent to the first input frame;

generating, based on the first plurality of feature vectors and by a slot vector model of the machine learning model, a first plurality of slot vectors, wherein each respective slot vector of the first plurality of slot vectors represents attributes of a corresponding entity as represented in the first input frame;

generating, based on the first plurality of slot vectors and by a predictor model of the machine learning model, a plurality of predicted slot vectors comprising, for each respective slot vector of the first plurality of slot vectors, a corresponding predicted slot vector that represents a transition of the attributes of the corresponding entity from the first input frame to the second input frame, wherein generating the plurality of predicted slot vectors comprises:

determining a plurality of self-attention scores based on the first plurality of slot vectors;

generating an intermediate output based on a first sum of (i) the plurality of self-attention scores and (ii) the first plurality of slot vectors; and determining the plurality of predicted slot vectors based on a second sum of the intermediate output and the first sum;

generating, based on the plurality of predicted slot vectors and the second plurality of feature vectors and by the slot vector model, a second plurality of slot vectors comprising, for each respective slot vector of the first plurality of slot vectors, a corresponding slot vector that represents the attributes of the corresponding entity as represented in the second input frame; and determining, by the machine learning model, a task-specific output based on one or more of: (i) at least one predicted slot vector of the plurality of predicted slot vectors or (ii) at least one slot vector of the second plurality of slot vectors; and causing a device to perform a task based on the task-specific output.

19. The computer-implemented method of claim 1, wherein the first plurality of slot vectors are generated using a first number of iterations of the slot vector model, wherein the second plurality of slot vectors are generated using a second number of iterations of the slot vector model, and wherein the second number of iterations is smaller than the first number of iterations.

20. The computer-implemented method of claim 1, wherein causing the device to perform the task comprises:

causing the device to interact with an environment represented by the input data sequence.

* * * * *